United States Patent
Wang et al.

(10) Patent No.: US 12,430,786 B2
(45) Date of Patent: Sep. 30, 2025

(54) LINEWIDTH MEASUREMENT METHOD AND APPARATUS, COMPUTING AND PROCESSING DEVICE, COMPUTER PROGRAM AND COMPUTER READABLE MEDIUM

(71) Applicant: BOE Technology Group Co., Ltd., Beijing (CN)

(72) Inventors: Sifan Wang, Beijing (CN); Yulan Hu, Beijing (CN); Yanzhao Li, Beijing (CN); Chao Zhou, Beijing (CN); Tuo Sun, Beijing (CN); Longfei Li, Beijing (CN); Shuo Zhang, Beijing (CN); Zhenzhong Zhang, Beijing (CN); Cuifang Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/921,535

(22) PCT Filed: Oct. 29, 2021

(86) PCT No.: PCT/CN2021/127697
§ 371 (c)(1),
(2) Date: Oct. 26, 2022

(87) PCT Pub. No.: WO2023/070593
PCT Pub. Date: May 4, 2023

(65) Prior Publication Data
US 2024/0221201 A1   Jul. 4, 2024

(51) Int. Cl.
*G06T 7/62* (2017.01)
*G06T 5/30* (2006.01)
(Continued)

(52) U.S. Cl.
CPC .............. *G06T 7/62* (2017.01); *G06T 5/30* (2013.01); *G06T 7/13* (2017.01); *G06T 7/187* (2017.01); *G06T 2207/20036* (2013.01)

(58) Field of Classification Search
CPC .... G06T 7/62; G06T 5/30; G06T 7/13; G06T 7/187; G06T 2207/20036; G06T 7/00
See application file for complete search history.

(56) References Cited

U.S. PATENT DOCUMENTS 10,475,179 B1 * 11/2019 Bishop ............... G06T 7/001
11,551,341 B2 * 1/2023 Zhang ............... G01N 33/383

FOREIGN PATENT DOCUMENTS

| CN | 103389041 A | 11/2013 |
|---|---|---|
| CN | 106228543 A | 12/2016 |

(Continued)

*Primary Examiner* — Stephen R Koziol
*Assistant Examiner* — Dylan J Sherrillo
(74) *Attorney, Agent, or Firm* — IPro, PLLC

(57) ABSTRACT

A linewidth measurement method includes: obtaining a target image of the line, the line including a first line segment; performing region connecting on an edge image or binary image of the target image to obtain a region connected image, the region connected image including a target connected region corresponding to a pattern of the line, and a pixel value of each pixel in the target connected region being different from that of each pixel outside the target connected region; determining a first edge point and a second edge point of the first line segment based on the region connected image; and determining a width of the first line segment according to the first edge point and the second edge point, and determining the width of the line according to the width of the first line segment.

18 Claims, 8 Drawing Sheets

(51) Int. Cl.
*G06T 7/13* (2017.01)
*G06T 7/187* (2017.01)

(56) References Cited

FOREIGN PATENT DOCUMENTS

CN 107798672 A * 3/2018 ........... G06T 7/0004
WO 2012121488 A2 9/2012

* cited by examiner

LINEWIDTH MEASUREMENT METHOD AND APPARATUS, COMPUTING AND PROCESSING DEVICE, COMPUTER PROGRAM AND COMPUTER READABLE MEDIUM

TECHNICAL FIELD

The disclosure relates to the technical field of computers and more particular, to a linewidth measurement method and apparatus, a computing and processing device, a computer program and a computer readable medium.

BACKGROUND

In a line preparation process, it is necessary to perform linewidth measurement on each batch of products to determine whether the batch of products is qualified, or to adjust the preparation process according to linewidth measurement results.

SUMMARY

The present disclosure provides a linewidth measurement method, for measuring a width of a line, including:
  obtaining a target image of the line, wherein the line comprises a first line segment;
  performing region connecting on an edge image or binary image of the target image to obtain a region connected image, wherein the edge image is an image obtained by edge detection of the target image, the binary image is an image obtained by image binarization of the target image, and the region connected image comprises a target connected region corresponding to a pattern of the line, and a pixel value of each pixel in the target connected region is different from that of each pixel outside the target connected region;
  determining a first edge point and a second edge point of the first line segment based on the region connected image, wherein the first edge point is located on a first edge line of the first line segment, the second edge point is located on a second edge line of the second line segment, and the first edge line and the second edge line are oppositely arranged in a first direction; and
  determining a width of the first line segment according to the first edge point and the second edge point, and determining the width of the line according to the width of the first line segment.

In an alternative implementation, performing region connecting on an edge image or binary image of the target image to obtain a region connected image includes:
  performing expansion treatment and flood filling treatment sequentially on the edge image or the binary image to obtain an expanded image;
  performing corrosion treatment on the expanded image to obtain a corroded image, wherein the corroded image comprises a plurality of connected regions, a pixel value of each pixel in the plurality of connected regions is a first pixel value, and a pixel value of each pixel outside the plurality of connected regions is a second pixel value, the plurality of connected regions comprises isolated connected regions and the target connected region, the isolated connected regions are connected regions with an area less than a preset threshold, and the target connected regions are connected regions with an area greater than or equal to the preset threshold; and
  setting a pixel value of each pixel in the isolated connected regions in the corroded image to be the second pixel value so as to obtain the region connected image.

In an alternative implementation, a convolution kernel used in the expansion treatment is with a same size as a convolution kernel used in the corrosion treatment.

In an alternative implementation, the target connected region comprises a first connected region corresponding to the first line segment, and determining the first edge point and the second edge point of the first line segment based on the region connected image comprises:
  extracting pixels on two opposite sides of the first connected region in the first direction to obtain the first edge point and the second edge point.

In an alternative implementation, the line further comprises a second line segment which intersects with the first line segment, and the first line segment comprises a first branch line located at one side of an intersection of the first line segment and the second line segment, and the second line segment comprises a second branch line located at one side of the intersection, and a plurality of pixels of the region connected image are arrayed in array in a row direction and in a column direction, extracting pixels on two opposite sides of the first connected region in the first direction to obtain the first edge point and the second edge point includes:
  determining a sampling region in the region connected image, wherein the sampling region comprises a first sampling region, the first sampling region comprises a first boundary and a second boundary which are oppositely arranged in the column direction, and a third boundary and a fourth boundary which connect the first boundary with the second boundary, a target connected region in the first sampling region comprises a first sub-connected region corresponding to the first branch line and a second sub-connected region corresponding to the second branch line, two oppositely arranged sides of the first sub-connected region in the first direction and two oppositely arranged sides of the second sub-connected region in the second direction are connected with both the first boundary and the second boundary, and the first sub-connected region is located at a side of the second sub-connected region close to the third boundary; and
  performing a first scanning treatment on pixels in the first sampling region, wherein the first scanning treatment comprises: scanning from the third boundary to the fourth boundary in a same row of pixels, and determining a first pixel whose pixel value is the first pixel value as the first edge point; scanning from the fourth boundary to the third boundary, and determining a first pixel whose pixel value is the first pixel value as a fourth edge point of the second line segment; determining a first center point of the first edge point and the fourth edge point in the same row of pixels; scanning from the first center point to the third boundary, and determining a first pixel whose pixel value is the first pixel value as the second edge point; scanning from the first center point to the fourth boundary, and determining a first pixel whose pixel value is the first pixel value as the third edge point of the second line segment;
  wherein the third edge point is located on a third edge line of the second line segment, the fourth edge point is located on a fourth edge line of the second line segment, and the third edge line and the fourth edge line are oppositely arranged in the second direction.

In an alternative implementation, the first line segment further comprises a third branch line located at the other side of the intersection, and the second line segment further comprises a fourth branch located at the other side of the intersection; the sampling region further comprises a second sampling region, the second sampling region comprises a fifth boundary and a sixth boundary which are oppositely arranged in the column direction, and a seventh boundary and an eighth boundary which connect the fifth boundary with the sixth boundary; a target connected region in the second sampling region comprises a third sub-connected region corresponding to the third branch line and a fourth sub-connected region corresponding to the fourth branch line, two oppositely arranged sides of the third sub-connected region in the first direction and two oppositely arranged sides of the fourth sub-connected region in the second direction are connected with both the fifth boundary and the sixth boundary, and the third sub-connected region is located at a side of the fourth sub-connected region close to the eighth boundary;

extracting pixels on two opposite sides of the first connected region in the first direction to obtain the first edge point and the second edge point further includes:

performing a second scanning treatment on pixels in the second sampling region, wherein the second scanning treatment comprises: scanning from the seventh boundary to the eighth boundary in a same row of pixels, and determining a first pixel whose pixel value is the first pixel value as the third edge point; scanning from the eighth boundary to the seventh boundary, and determining a first pixel whose pixel value is the first pixel value as the second edge point; determining a second center point of the third edge point and the second edge point in the same row of pixels; scanning from the second center point to the seventh boundary, and determining a first pixel whose pixel value is the first pixel value as the fourth edge point; scanning from the second center point to the eighth boundary, and determining a first pixel whose pixel value is the first pixel value as the first edge point.

In an alternative implementation, determining the width of the first line segment according to the first edge point and the second edge point includes:

performing straight line fitting on a plurality of first edge points to obtain the first edge line; and performing straight line fitting on a plurality of second edge points to obtain the second edge line;

calculating a first distance from the first edge point to the second edge line and a second distance from the second edge point to the first edge line; and calculating an average of the first distance and the second distance to obtain a width of the first line segment;

before determining the width of the line according to the width of the first line segment, the method further includes:

performing straight line fitting on a plurality of third edge points to obtain the third edge line and performing straight line fitting on a plurality of fourth edge points to obtain the fourth edge line;

calculating a third distance from the third edge point to the fourth edge line and a fourth distance from the fourth edge point to the third edge line; and calculating an average of the third distance and the fourth distance to obtain a width of the second line segment;

determining the width of the line according to the width of the first line includes:

determining the width of the line according to the width of the first line segment and the width of the second line segment, wherein the width of the line comprises at least one of: an average of the width of the first line segment and the width of the second line segment, the width of the first line segment and the width of the second line segment.

In an alternative implementation, the target connected region further comprises a second connected region corresponding to the second line segment, and determining the sampling region in the region connected image includes:

determining overlapping coordinates of the first connected region and the second connected region based on the region connected image, wherein the overlapping coordinates are coordinates of an overlapping pixel located in an overlapping region of the first connected region and the second connected region; and determining the first sampling region and the second sampling region according to the overlapping coordinates and a ninth boundary and a tenth boundary of the region connected image which are oppositely arranged in the column direction, wherein the first boundary is determined by translation of the ninth boundary by a first preset distance in the column direction towards a direction of the overlapping pixel, the second boundary is determined by translation of a first dividing line by a second preset distance in the column direction towards a direction of the ninth boundary, the fifth boundary is determined by translation of the first dividing line by a third preset distance in the column direction towards a direction of the tenth boundary, the sixth boundary is determined by translation of the tenth boundary by a fourth preset distance in the column direction towards a direction of the overlapping pixel, and the first dividing line is a straight line passing through the overlapping pixel and extending in the row direction.

In an alternative implementation, the region connected image further comprises a reference boundary connecting the ninth boundary and the tenth boundary, and an extension direction of the first line segment and/or the second line segment is different from the column direction, and determining the overlapping coordinates of the first connected region and the second connected region based on the region connected image includes:

performing progressive scanning on the pixels in the region connected image from the ninth boundary, wherein the progressive scanning comprises: if a distance between a reference pixel of a current scanning row and the reference boundary is greater than or equal to a distance between a reference pixel of a previous scanning row and the reference boundary, and greater than or equal to a distance between a reference pixel of a next scanning row and the reference boundary, determining coordinates of the reference pixel of the current scanning row as the overlapping coordinates, wherein the reference pixel is a first pixel whose pixel value is the first pixel value in the same row of pixels in scanning from the reference boundary.

In an alternative implementation, determining the overlapping coordinates of the first connected region and the second connected region based on the region connected image includes:

performing straight line detection on the pixels in the first connected region and the second connected region to obtain a plurality of detected line segments;

clustering the plurality of detected line segments to obtain two clusters; and determining intersection coordinates of two line segments corresponding to cluster centers of the two clusters as the overlapping coordinates.

In an alternative implementation, the first line segment comprises a fifth branch line, and a plurality of pixels of the region connected image are arrayed in array in the row direction and in the column direction, extracting pixels on two opposite sides of the first connected region in the first direction to obtain the first edge point and the second edge point comprises:

determining a third sampling region in the region connected image, wherein the third sampling region comprises an eleventh boundary and a twelfth boundary which are oppositely arranged in the column direction, and a thirteenth boundary and a fourteenth boundary which connect the eleventh boundary and the twelfth boundary, a target connected region in the third sampling region comprises a fifth sub-connected region corresponding to the fifth branch line, and two oppositely arranged sides of the fifth sub-connected region in the first direction are connected with both the eleventh boundary and the twelfth boundary; and performing a third scanning treatment on pixels in the third sampling region, wherein the third scanning treatment comprises scanning from the thirteenth boundary to the fourteenth boundary in a same row of pixels, and determining a first pixel whose pixel value is the first pixel value as the first edge point; and scanning from the fourteenth boundary to the thirteenth boundary, and determining a first pixel whose pixel value is the first pixel value as the second edge point.

In an alternative implementation, the target connected region comprises a third connected region corresponding to the first line segment, the first edge line comprises a first outer edge line and a first inner edge line, and the second edge line comprises a second outer edge line and a second inner edge line, and a convolution kernel used in the expansion treatment is smaller than that used in the corrosion treatment, so that one of two opposite sides of the third connected region in the first direction is located between the first outer edge line and the first inner edge line, and the other side of the two opposite sides is located between the second outer edge line and the second inner edge line.

In an alternative implementation, the line further comprises a second line segment which intersects with the first line segment, and the first line segment comprises a sixth branch line which is located at one side of an intersection of the first line segment and the second line segment, and after obtaining the region connected image, the method further comprises:

extracting a skeleton image of the region connected image, wherein the skeleton image comprises a skeleton, a pixel value of each pixel in the skeleton is different from a pixel value of each pixel outside the skeleton, and the skeleton comprises a center line corresponding to the sixth branch line;

before determining the first edge point and the second edge point of the first line segment based on the region connected image, the method further comprises:

performing straight line detection on the edge image so as to obtain a plurality of edge line segments; and determining a target line segment corresponding to the sixth branch line from the plurality of edge line segments;

determining the first edge point and the second edge point of the first line segment based on the region connected image comprises:

determining the first outer edge line, the first inner edge line, the second outer edge line and the second inner edge line from the target line segment according to a relationship between a position of the target line segment in the edge image, a position of the third connected region in the region connected image and a position of the center line in the skeleton image.

In an alternative implementation, determining the first outer edge line, the first inner edge line, the second outer edge line and the second inner edge line from the target line segment according to the relationship between the position of the target line segment in the edge image, the position of the third connected region in the region connected image and the position of the center line in the skeleton image comprises:

according to the position of the target line segment in the edge image, determining a first mapping region corresponding to the target line segment at a corresponding position in the region connected image, and determining a second mapping region corresponding to the target line segment at a corresponding position in the skeleton image;

if the first mapping region is located at a first side outside the third connected region, determining the target line segment corresponding to the first mapping region as the first outer edge line;

if the first mapping region is located at a second side outside the third connected region, determining the target line segment corresponding to the first mapping region as the second outer edge line;

if the first mapping region is located within the third connected region and the second mapping region is located at a first side of the center line, determining target line segments corresponding to the first mapping region and the second mapping region as the first inner edge line; and if the first mapping region is located within the third connected region and the second mapping region is located at a second side of the center line, determining target line segments corresponding to the first mapping region and the second mapping region as the second inner edge line.

In an alternative implementation, the region connected image comprises a fifteenth boundary and a sixteenth boundary which are oppositely arranged, before determining the first outer edge line, the first inner edge line, the second outer edge line and the second inner edge line from the target line segment according to the relationship between the position of the target line segment in the edge image, the position of the third connected region in the region connected image and the position of the center line in the skeleton image, the method comprises:

setting a pixel value of each pixel in a region located between the target connected region and the fifteenth boundary and a region located between the target connected region and the sixteenth boundary in the region connected image as the third pixel value;

if a pixel value of each pixel in the first mapping region is the third pixel value, determining that the first mapping region is located at the first side outside the third connected region;

if the pixel value of each pixel in the first mapping region is the second pixel value, determining that the first mapping region is located at the second side outside the third connected region; and
if the pixel value of each pixel in the first mapping region is the first pixel value, determining that the first mapping region is located within the third connected region.

In an alternative implementation, before determining the first outer edge line, the first inner edge line, the second outer edge line and the second inner edge line from the target line segment according to the relationship between the position of the target line segment in the edge image, the position of the third connected region in the region connected image and the position of the center line in the skeleton image, the method further comprises:
performing an exclusive-or operation on the region connected image and the expanded image so as to obtain an intermediate image, wherein the intermediate image comprises a plurality of discrete complementary regions, a pixel value of each pixel in the plurality of discrete complementary regions is the fourth pixel value, a pixel value of each pixel outside the plurality of discrete complementary regions is a fifth pixel value, and the intermediate image comprises a seventeenth boundary and an eighteenth boundary which are oppositely arranged;
setting a pixel value of each pixel in a complementary region adjacent to the seventeenth boundary and a complementary region adjacent to the eighteenth boundary in the intermediate image as a sixth pixel value;
determining a third mapping region corresponding to the target line segment at a corresponding position in the intermediate image according to the position of the target line segment in the edge image;
if a pixel value of each pixel in the third mapping region is the sixth pixel value, determining that the first mapping region is located at the first side outside the third connected region; and
if the pixel value of each pixel in the third mapping region is the fourth pixel value, determining that the first mapping region is located at the second side outside the third connected region.

In an alternative implementation, the skeleton image comprises a nineteenth boundary and a twentieth boundary which are oppositely arranged, and a pixel value of each pixel in the skeleton is a seventh pixel value, and the pixel value of each pixel outside the skeleton is an eighth pixel value; and before determining the first outer edge line, the first inner edge line, the second outer edge line and the second inner edge line from the target line segment according to the relationship between the position of the target line segment in the edge image, the position of the third connected region in the region connected image and the position of the center line in the skeleton image, the method comprises:
setting a pixel value of each pixel in a region located between the skeleton and the nineteenth boundary and a region located between the skeleton and the twentieth boundary in the skeleton image as a ninth pixel value;
if a pixel value of each pixel in the second mapping region is the ninth pixel value, determining that the second mapping region is located at a first side of the center line; and
if the pixel value of each pixel in the second mapping region is the eighth pixel value, determining that the second mapping region is located at a second side of the center line.

In an alternative implementation, determining the width of the first line segment according to the first edge point and the second edge point comprises:
calculating a fifth distance from an end point of the first outer edge line to the second outer edge line;
calculating a sixth distance from the end point of the second outer edge line to the first outer edge line;
calculating a seventh distance from the end point of the first inner edge line to the second inner edge line;
calculating an eighth distance from the end point of the second inner edge line to the first inner edge line; and
calculating an average of the fifth distance, the sixth distance, the seventh distance and the eighth distance to obtain the width of the first line segment.

In an alternative implementation, obtaining the target image of the line comprises:
obtaining an original image of the line; and
performing preprocessing on the original image to obtain the target image, wherein the preprocessing comprises at least one of graying, contrast enhancement, brightness enhancement and denoising.

In an alternative implementation, performing preprocessing on the original image comprises:
performing the denoising on the original image to obtain a denoised image;
extracting edge pixels of the denoised image and counting a total number of the edge pixels; and
if the total number is less than or equal to a preset number, performing the contrast enhancement on the original image.

The present disclosure provides a linewidth measurement apparatus, for measuring a width of a line, including:
an image acquisition module configured to obtain a target image of the line, wherein the line comprises a first line segment;
a connecting module configured to perform region connecting on an edge image or binary image of the target image to obtain a region connected image, wherein the edge image is an image obtained by edge detection of the target image, the binary image is an image obtained by image binarization of the target image, and the region connected image comprises a target connected region corresponding to a pattern of the line, and a pixel value of each pixel in the target connected region is different from a pixel value of each pixel outside the target connected region;
an edge determination module configured to determine a first edge point and a second edge point of the first line segment based on the region connected image, wherein the first edge point is located on a first edge line of the first line segment, the second edge point is located on a second edge line of the second line segment, and the first edge line and the second edge line are oppositely arranged in a first direction; and
a width calculation module configured to determine a width of the first line segment according to the first edge point and the second edge point, and determine the width of the line according to the width of the first line segment.

A computing processing device is provided in the present disclosure, which includes:
a memory with computer readable codes stored therein;
one or more processors, the computing processing device executing the method according to any of embodiments when the computer readable code is executed by the one or more processors.

A computer program is provided in the present disclosure, which includes computer readable code, which, when executed on a computing processing device, causes the computing processing device to execute the method according to any of embodiments.

A computer readable medium with the method according to any of embodiments stored therein is provided in the present disclosure.

The above description is only a summary of technical schemes of the present disclosure, which may be implemented according to contents of the specification in order to better understand technical means of the present disclosure; and in order to make above and other objects, features and advantages of the present disclosure more obvious and understandable, detailed description of the present disclosure is particularly provided in the following.

BRIEF DESCRIPTION OF THE DRAWINGS

In order to explain technical schemes in embodiments of this disclosure or related art more clearly, drawings required in the description of the embodiments or the related art will be briefly introduced below; obviously, the drawings in the following description are some of the embodiments of the present disclosure, and other drawings may be obtained according to these drawings by the ordinary skilled in the art without paying creative effort. It should be noted that a scale in the drawings is only schematic and does not indicate an actual one.

DETAILED DESCRIPTION OF THE EMBODIMENTS

In order to make purposes, technical schemes and advantages of embodiments of this disclosure clearer, the technical schemes in the embodiments of this disclosure will be described clearly and completely with reference to the drawings in the embodiments of this disclosure; and it is obvious that the described embodiments are part of the embodiments of this disclosure, but not all of them. On a basis of the embodiments in this disclosure, all other embodiments obtained by the ordinary skilled in the art without paying creative effort are within a protection scope of this disclosure.

In related art, an electron microscope is usually used to photograph and obtain the high-magnification image of the sample to be measured and then professional software is used to manually measure a width of a line, not only with large error but also with low efficiency.

Figure 1:
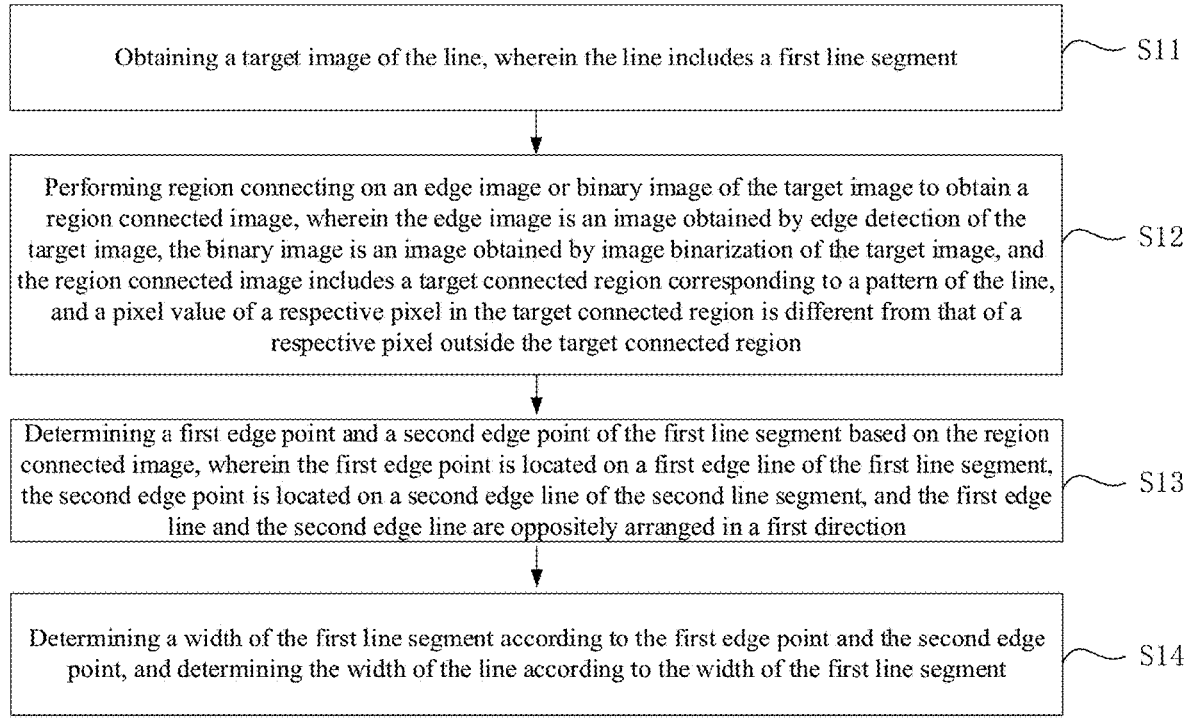
FIG. 1 schematically shows a flow chart of a linewidth measurement method.

In order to automatically measure the width of the line, FIG. 1 schematically shows a flow chart of a linewidth measurement method. As shown in FIG. 1, the method may include the following steps S11 to S14.

Step S11, obtaining a target image of the line, and the line includes a first line segment.

An executing subject of this embodiment may be a computer device, which has a linewidth measurement apparatus, and the linewidth measurement method according to this embodiment is executed by this linewidth measurement apparatus. The computer device may be, for example, a smart phone, a tablet computer, a personal computer, etc., which is not limited in this disclosure.

In a specific implementation, this step may specifically include following content. An original image of the line is obtained firstly, and preprocessing is performed on the original image to obtain the target image. Among them, the preprocessing includes at least one of the following: graying, contrast enhancement, brightness enhancement and denoising.

The executive subject of this embodiment may be connected with a camera apparatus to obtain the original image collected by the camera apparatus. The original image may an image with resolution and exposure meeting requirements, for example, with the resolution of 480×640, and the exposure may be set according to actual requirements.

Optionally, a step in which the preprocessing is performed on the original image may specifically include following content. Firstly, the original image is denoised to obtain a denoised image; then edge pixels of the denoised image are extracted, and a total number of the edge pixels is counted; and if the total number is less than or equal to a preset number, contrast enhancement is performed on the original image.

In a specific implementation, Gaussian filtering may be performed on the original image to remove obvious salt and pepper noise. Then, a canny operator may be used for edge detection to obtain the edge pixels. Then, the total number of the edge pixels may be counted. If the total number is greater than the preset number, it means that the edge is clear, and no contrast enhancement is performed. If the total number is less than or equal to the preset number, it means the edge is blurred, then contrast enhancement is performed on the original image. The preset number may be obtained by statistically averaging a number of edge pixels of multiple images.

Figure 2:
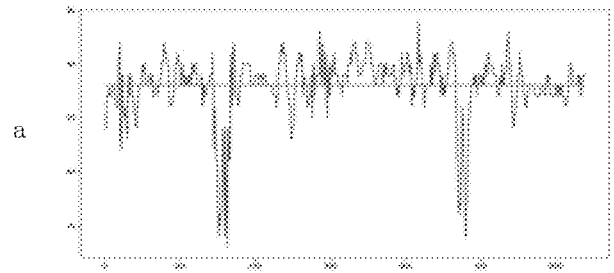
FIG. 2 schematically shows fluctuation of pixel values before and after contrast enhancement.
Figure 2:
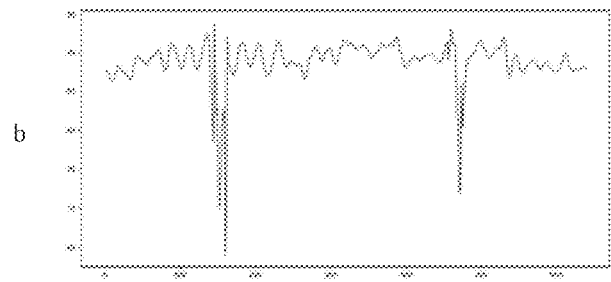

In a specific implementation, low-pass filtering may be used for the contrast enhancement. Referring to FIG. 2, a schematic diagram fluctuation of pixel values before and after low-pass filtering is shown. As shown in FIG. 2, plan a represents pixel value distribution of a row of pixels before low-pass filtering of the original image, a curve represents the pixel values, a horizontal straight line represents an average, and a position with a largest amplitude fluctuation corresponds to a region where an edge is located. As shown in FIG. 2, plan b represents a pixel value fluctuation curve of a row of pixels after low-pass filtering of the original image.

Specifically, a sliding window may be set with W pixels, and during sliding from left to right along a row of pixels and when a fluctuation amplitude in the sliding window is greater than 80% of a maximum fluctuation amplitude, no filtering is performed, otherwise, mean averaging is performed. In this way, a result with uniform background and enhanced contrast may be obtained, as shown in plan b in FIG. 2. The sliding window W may be taken as 3, 5, 7 or other values.

Step S12, performing region connecting on an edge image or binary image of the target image to obtain a region connected image. The edge image is an image obtained by edge extraction of the target image, the binary image is an image obtained by image binarization of the target image, and the region connected image includes a target connected region corresponding to a pattern of the line, and a pixel value of each pixel in the target connected region is different from that of each pixel outside the target connected region.

In a specific implementation, a gray histogram of RGB three channels of the target image may be firstly calculated, and then edge detection may be performed by using adaptive threshold edge detection algorithm or Canny algorithm according to the gray histogram, so as to obtain the edge image of the target image. Referring to plan a in FIG. 8, an edge image of an X-shaped line is shown, and referring to plan e in FIG. 8, a region connected image corresponding to the edge image is shown.

In order to obtain a binary image, the target image may be Gaussian filtered and grayed at first, and then binarized by using the adaptive threshold binarization algorithm to obtain a binary image of the target image. Plan d in FIG. 7 represents a region connected image corresponding to a binary image of an X-type line.

In a specific implementation, various methods may be used to realize the region connecting. Referring to plans a to d in FIG. 7, a flowchart of obtaining a region connected image based on a binary image of an original image in which the line shape is X-shaped is shown. Specifically, step S12 may include following content: firstly, expansion treatment and flood filling treatment are sequentially performed on the binary image of the original image to obtain an expanded image (as shown by plan b in FIG. 7). Corrosion treatment is performed on the expanded image to obtain a corroded image (as shown by plan c in FIG. 7). The corroded image includes a plurality of connected regions, a pixel value of each pixel in the connected regions is a first pixel value, and a pixel value of each pixel outside the connected regions is a second pixel value. The plurality of connected regions include isolated connected regions and the target connected region. The isolated connected regions are connected regions with an area smaller than a preset threshold, and the target connected regions are connected regions with an area larger than or equal to the preset threshold. Afterwards, a pixel value of each pixel in the isolated connected regions in the corroded image is set to be the second pixel value so as to obtain the region connected image (as shown by plan d in FIG. 7).

Figure 7:
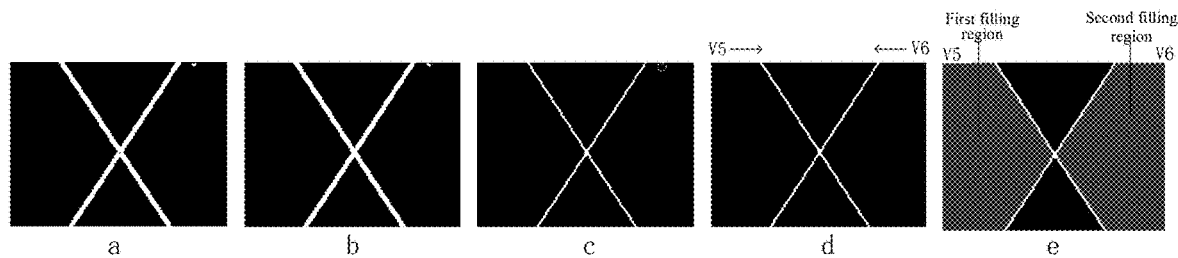
FIG. 7 schematically shows a flow chart of obtaining a region connected image.

The first pixel value may be 255, for example, as shown in a white region of FIG. 7. The second pixel value may be 0, as shown in a black region of FIG. 7. Plan a in FIG. 7 represents an image obtained by expansion treatment the binary image of the original image. In expansion treatment, smaller holes or slits may be connected. If there are still large holes in the expanded and connected region after expansion treatment (as shown by a center position in plan a in FIG. 7), flood filling treatment algorithm may be used to fill the holes in the expanded and connected region to obtain the expanded image, as shown in plan b in FIG. 7. It should be noted that if there is no large hole in the expanded and connected region after expansion treatment, no flood filling treatment is performed, which is not necessary and may be selected according to actual situations.

The corroded image obtained by corrosion treatment the expanded image may have isolated connected regions, such as white dots in a dotted box at an upper right corner of plan c in FIG. 7. To remove these isolated connected regions, areas of respective connected regions is calculated, and then a pixel value of a connected region whose area is smaller than a preset threshold is set as the second pixel value such as 0, and only a pixel value of each pixel in the target connected region is the first pixel value (such as 255, corresponding to the white region shown by plan d in FIG. 7), a pixel value of each pixel outside the target connected region is the second pixel value (such as 0, corresponding to the black region shown by plan d in FIG. 7), and a region connected image shown by plan d in FIG. 7 is obtained. The preset threshold may be set to be 50, for example, and its specific value may be set according to actual requirements.

Figure 3:
FIG. 3 schematically shows a group of corroded images and region connected images.

Referring to FIG. 3, a comparison diagram of a group of corroded images and region connected images is schematically shown. Plan a in FIG. 3 shows a corroded image with a plurality of isolated connected regions in the black region, and plan b in FIG. 3 shows a region connected image after the isolated connected regions in the corroded image are removed. By removing the isolated connected regions, edges of isolated connected regions may be prevented from interfering with extraction of edge points of the line, and accuracy of linewidth measurement may be improved.

Figure 8:
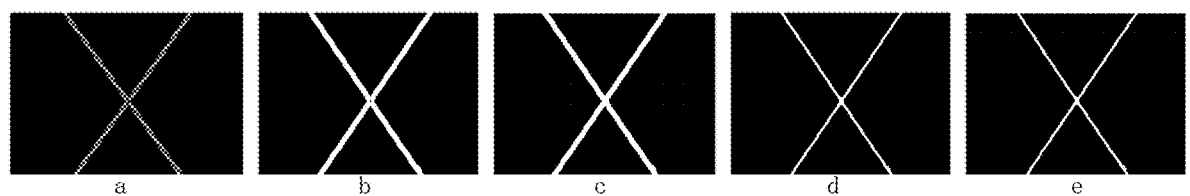
FIG. 8 schematically shows another flow chart of obtaining a region connected image.

Referring to plans a to e in FIG. 8, a flowchart of obtaining a region connected image based on the edge image of the original image in which the line shape is X-shaped is shown. Specifically, step S12 may include following content: firstly, expansion treatment and flood filling treatment are sequentially performed on the edge image of the original image (as shown by plan a in FIG. 8) to obtain an expanded image (as shown by plan c in FIG. 8). Corrosion treatment is performed on the expanded image to obtain a corroded image (as shown by plan d in FIG. 8). The corroded image includes a plurality of connected regions, a pixel value of each pixel in the connected regions is a first pixel value, and a pixel value of each pixel outside the connected regions is a second pixel value. The plurality of connected regions include isolated connected regions and the target connected region. The isolated connected regions are connected regions with an area smaller than a preset threshold, and the target connected regions are connected regions with an area larger than or equal to the preset threshold. Afterwards, a pixel value of each pixel in the isolated connected regions in the corroded image is set to be the second pixel value so as to obtain the region connected image (as shown by plan e in FIG. 8).

The first pixel value may be 255, for example, as shown in a white region of FIG. 8. The second pixel value may be 0, as shown in a black region of FIG. 8. Plan a in FIG. 8 shows the edge image of the original image, and plan b in FIG. 8 shows an image obtained by expansion treatment the edge image. In expansion treatment, smaller holes or slits may be connected. If there are still large holes in the expanded and connected region after expansion treatment (as shown by a center position in plan b in FIG. 8), flood filling treatment algorithm may be used to fill the holes in the expanded and connected region to obtain the expanded image, as shown in plan c in FIG. 8. It should be noted that if there is no large hole after expansion treatment, no flood filling treatment is performed, which is not necessary and may be selected according to actual situations.

The corroded image obtained by corrosion treatment the expanded image may have isolated connected regions. To remove these isolated connected regions, areas of respective connected regions is calculated, and then a pixel value of a connected region whose area is smaller than a preset threshold is set as the second pixel value, and only a pixel value of each pixel in the target connected region is the first pixel value (such as 255, corresponding to the white region in FIG. 8), a pixel value of each pixel outside the target connected region is the second pixel value (such as 0, corresponding to the black region in FIG. 8), and a region connected image shown by plan e in FIG. 8 is obtained.

Because the edge image or binary image may be discontinuous, in this implementation, broken line connection or region connecting may be realized by expansion treatment and then corrosion treatment the edge image or binary image, which facilitates extracting of a complete edge line and improves the accuracy of the linewidth measurement.

Expansion treatment and corrosion treatment are called morphological operations, which are usually performed on the binary image. The expansion treatment is to expand the white region in the image by adding pixels to a perceived boundary of an object in the image. Instead, the corrosion treatment removes pixels along the boundary of the object and reduces a size of the object.

In a specific implementation, a convolution kernel with a certain size is required to be provided for a convolution operation on the image in both expansion treatment and corrosion treatment. The size of the convolution kernel may be determined according to a number of pixels between two edge lines. For example, when a distance between the two edge lines covers 5 to 10 pixels, the size of the convolution kernel may be set to be 3×3 or 5×5, which is not limited in this disclosure.

In this embodiment, the convolution kernel used in the expansion treatment and the convolution kernel used in the corrosion treatment may have a same size or different sizes.

Step S13, determining a first edge point and a second edge point of the first line segment based on the region connected image. The first edge point is located on a first edge line of the first line segment, the second edge point is located on a second edge line of the second line segment, and the first edge line and the second edge line are oppositely arranged in a first direction.

In a specific implementation, a specific way of extracting the first edge point and the second edge point may be determined according to a size relationship between the convolution kernel used in the expansion treatment and the convolution kernel used in the corrosion treatment.

For example, when the convolution kernel used in the expansion treatment is with a same size as the convolution kernel used in the corrosion treatment, a width of the first connected region corresponding to the first line segment in the region connected image is the same as that of the first line segment, and thus the pixel points on a pair of sides of the first connected region oppositely arranged in the first direction in the region connected image may be extracted as the first edge point and the second edge point of the first line segment. When the convolution kernel used in expansion treatment has a size different from the convolution kernel used in corrosion treatment, straight line detection may be performed on the edge pixels in the edge image to obtain the edge line segment. Then, the first edge line and the second edge line are determined from the edge line segment according to a positional relationship between the edge line segment and the target connected region in the region connected image. These two situations will be illustrated in the following in detail respectively.

Step S14, determining a width of the first line segment according to the first edge point and the second edge point. A width of the line is determined according to the width of the first line segment.

In a specific implementation, a distance between the first edge point and the second edge line and a distance between the second edge point and the first edge line may be calculated, and the calculated distance may be averaged so as to obtain the width of the first line segment.

If only the first line segment is included in the line, the width of the first line segment may be determined as the width of the line; If the line includes a plurality of line segments such as the first line segment, widths of the line segments may be calculated respectively, and then an average of the widths of the line segments may be determined as the width of the line.

In the linewidth measurement method according to this embodiment, automatic measurement of linewidth may be realized, which has high operability in a process of mass production and may significantly improve measurement efficiency and accuracy. With the method according to this embodiment, it is possible to carry out macro measurement on a line in a nano-scale microscopic image.

In an alternative implementation, a convolution kernel used in the expansion treatment is with a same size as a convolution kernel used in the corrosion treatment. When the convolution kernel used in the expansion treatment is with a same size as the convolution kernel used in the corrosion treatment, a width of the first connected region corresponding to the first line segment in the region connected image is the same as that of the first line segment, and thus the pixel points on a pair of sides of the first connected region oppositely arranged in the first direction in the region connected image may be taken as the first edge point and the second edge point of the first line segment.

In this implementation, the target connected region includes the first connected region corresponding to the first line segment, and step S13 specifically includes following contents. Pixels on two opposite sides of the first connected region in the first direction are extracted to obtain the first edge point and the second edge point.

Figure 4A:
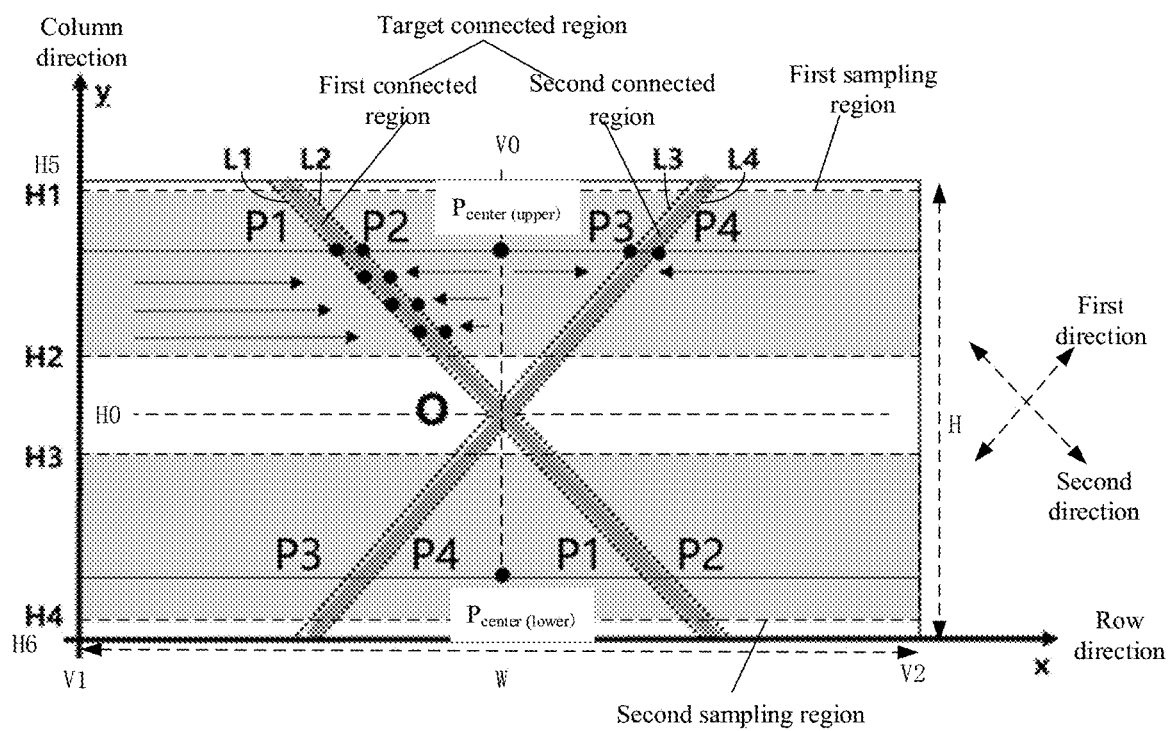
FIG. 4a schematically shows a diagram of a region connected image.

Referring to FIG. 4a, a schematic diagram of the region connected image is shown. As shown in FIG. 4a, the first connected region has two opposite sides L1 and L2 in the first direction, and a pixel P1 on L1 may be taken as the first edge point and a pixel P2 on L2 may be taken as the second edge point.

When the line also includes a second line segment that intersects with the first line segment, the second line segment has a third edge line and a fourth edge line that are oppositely arranged in a second direction, and the target connected region further includes a second connected region corresponding to the second line segment. Step S13 may further include following extent. Pixels on two opposite sides of the second connected region in the second direction are extracted to obtain a third edge point on the third edge line and a fourth edge point on the fourth edge line.

As shown in FIG. 4a, the second connected region has two opposite sides L3 and L4 in the second direction, respectively. A pixel P3 on L3 may be taken as the third edge point, and a pixel P4 on L4 may be taken as the fourth edge point.

When the line includes the first line segment and the second line segment provided, the first line segment includes a first branch line located at one side of an intersection of the first line segment and the second line segment, and the second line segment includes a second branch line located at one side of the intersection. Neither the first branch line nor the second branch line includes an intersection. A plurality of pixels of the region connected image may be arrayed in array in a row direction and in a column direction, Accordingly, referring to FIG. 4a, step S13 may specifically include following content.

Firstly, a sampling region in the region connected image is determined. The sampling region includes a first sampling region. The first sampling region includes a first boundary H1 and a second boundary H2 which are oppositely arranged in the column direction, and a third boundary V1 and a fourth boundary V2 which connect the first boundary H1 with the second boundary H2. A target connected region in the first sampling region only includes a first sub-connected region corresponding to the first branch line and a second sub-connected region corresponding to the second branch line. Two oppositely arranged sides of the first sub-connected region in the first direction and two oppositely arranged sides of the second sub-connected region in the second direction are connected with both the first boundary H1 and the second boundary H2, and the first sub-connected region is located at a side of the second sub-connected region close to the third boundary V1.

Then, a first scanning treatment is performed on pixels in the first sampling region. The first scanning treatment includes scanning from the third boundary V1 to the fourth boundary V2 in a same row of pixels, and determining a first pixel whose pixel value is the first pixel value as the first edge point P1; scanning from the fourth boundary V2 to the third boundary V1, and determining a first pixel whose pixel value is the first pixel value as a fourth edge point P4 of the second line segment; determining a first center point $P_{(center)\ upper}$ of the first edge point P1 and the fourth edge point P4 in the same row of pixels; scanning from the first center point $P_{(center)\ upper}$ to the third boundary V1, and determining a first pixel whose pixel value is the first pixel value as the second edge point P2; scanning from the first center point $P_{(center)\ upper}$ to the fourth boundary V2, and determining a first pixel whose pixel value is the first pixel value as the third edge point P3 of the second line segment.

It should be noted that in FIG. 4a, the target connected region is a dark gray region, that is, a pixel region corresponding to the first pixel value.

In FIG. 4a, the first sub-connected region is a part of the first connected region located at an upper left of the intersection O, and the second sub-connected region is a part of the second connected region located at an upper right of the intersection O. Neither the first sub-connected region nor the second sub-connected region includes an overlapping region of the first connected region and the second connected region.

As shown in FIG. 4a, the two oppositely arranged sides of the first sub-connected region in the first direction are respectively connected to the first boundary H1 and connected to the second boundary H2. By connecting the two oppositely arranged sides of the first sub-connected region in the first direction with the first boundary H1 and the second boundary H2, it is possible to avoid extracting pixels on other sides of the first sub-connected region, thus improving the extraction accuracy of the first edge point and the second edge point and improving the linewidth measurement accuracy.

As shown in FIG. 4a, the two oppositely arranged sides of the second sub-connected region in the second direction are respectively connected to the first boundary H1 and connected to the second boundary H2. By connecting the two oppositely arranged sides of the second sub-connected region in the second direction with the first boundary H1 and the second boundary H2, it is possible to avoid extracting pixels on other sides of the second sub-connected region, thus improving the extraction accuracy of the third edge point and the fourth edge point and improving the linewidth measurement accuracy.

Specifically, in the first sampling region, the first scanning treatment may sequentially be made downwards from a row of pixels where the first boundary H1 is located, and in scanning downwards, the scanning may be made progressively or in an interlaced manner, etc.

Within each row of pixels or a scanning row, when scanning is made from the third boundary V1 on the left to the fourth boundary V2 on the right, as shown in FIG. 4a, since a pixel that is passed through at the beginning is located outside the target connected region, a pixel value of the pixel point is the second pixel value, and in scanning toward the right, a first pixel whose pixel value is the first pixel value is determined as the first edge point P1. When scanning is made from the fourth boundary V2 on the right to the third boundary V1 on the left, as shown in FIG. 4a, since a pixel that is passed through at the beginning is located outside the target connected region, a pixel value of the pixel point is the second pixel value, and in scanning toward the left, a first pixel whose pixel value is the first pixel value is determined as the fourth edge point P4 of the second line segment. A first center point $P_{(center)upper}$ of the first edge point P1 and the fourth edge point P4 in a same row of pixels is determined, and when scanning is made from the first center point $P_{(center)upper}$ to the third boundary V1 on the left, as shown in FIG. 4a, since a pixel that is passed through at the beginning is located outside the target connected region, a pixel value of the pixel point is the second pixel value, and in scanning toward the left, a first pixel whose pixel value is the first pixel value is determined as the second edge point P2. When scanning is made from the first center point $P_{(center)upper}$ to the fourth boundary V2 on the right, as shown in FIG. 4a, since a pixel that is passed through at the beginning is located outside the target connected region, a pixel value of the pixel point is the second pixel value, and in scanning to the right, a first pixel whose pixel value is the first pixel value is determined as the third edge point P3 of the second line segment.

Longitude coordinate of $P_{(center)\ upper}$ may be an average of the longitude coordinate of the first edge point P1 and the longitude coordinate of the fourth edge point P4 in the same row of pixels.

After the first scanning treatment of the first sampling region, the first edge point P1, the second edge point P2, the third edge point P3 and the fourth edge point P4 corresponding to a plurality of scanning rows may be obtained.

The above process may be applied to width measurement of V-shaped, X-shaped, Y-shaped lines, etc.

When the line shape is X-shaped, that is, the first line segment also includes a third branch line located at the other side of the intersection, and the second line segment further includes a fourth branch line located at the other side of the intersection.

In order to completely measure a width of the X-shaped line, as shown in FIG. 4a, the sampling region in the region connected image may further include a second sampling region. The second sampling region includes a fifth boundary H3 and a sixth boundary H4 which are oppositely arranged in the column direction, and a seventh boundary V1 and an eighth boundary V2 which connect the fifth boundary H3 with the sixth boundary H4. A target connected region in the second sampling region only includes a third sub-connected region corresponding to the third branch line and a fourth sub-connected region corresponding to the fourth branch line. Two oppositely arranged sides of the third sub-connected region in the first direction and two oppositely arranged sides of the fourth sub-connected region in the second direction are connected with both the fifth boundary H3 and the six boundary H4, and the first sub-connected region is located at a side of the fourth sub-connected region close to the eighth boundary V2.

Accordingly, step S13 may further include following content.

A second scanning treatment is performed on pixels in the second sampling region. The second scanning treatment includes scanning from the seventh boundary V1 to the eighth boundary V2 in a same row of pixels, and determining a first pixel whose pixel value is the first pixel value as the third edge point P3; scanning from the eighth boundary V2 to the seventh boundary V1, and determining a first pixel whose pixel value is the first pixel value as the second edge point P2; determining a second center point $P_{(center)\ lower}$ of the third edge point P3 and the second edge point P2 in the same row of pixels; scanning from the second center point $P_{(center)\ lower}$ to the seventh boundary V1, and determining a first pixel whose pixel value is the first pixel value as the fourth edge point P4; scanning from the second center point $P_{(center)\ lower}$ to the eighth boundary V2, and determining a first pixel whose pixel value is the first pixel value as the first edge point P1.

In FIG. 4a, the third sub-connected region is a part of the first connected region located at a lower right of the intersection O, and the fourth sub-connected region is a part of the second connected region located at a lower left of the intersection O. Neither the third sub-connected region nor the fourth sub-connected region includes an overlapping region of the first connected region and the second connected region.

As shown in FIG. 4a, the two oppositely arranged sides of the third sub-connected region in the first direction are respectively connected to the fifth boundary H3 and connected to the sixth boundary H4. By connecting the two oppositely arranged sides of the third sub-connected region in the first direction with the fifth boundary H3 and the sixth boundary H4, it is possible to avoid extracting pixels on other sides of the third sub-connected region, thus improving the extraction accuracy of the first edge point and the second edge point and improving the linewidth measurement accuracy.

As shown in FIG. 4a, the two oppositely arranged sides of the fourth sub-connected region in the second direction are respectively connected to the fifth boundary H3 and connected to the sixth boundary H4. By connecting the two oppositely arranged sides of the fourth sub-connected region in the second direction with the fifth boundary H3 and the sixth boundary H4, it is possible to avoid extracting pixels on other sides of the fourth sub-connected region, thus improving the extraction accuracy of the third edge point and the fourth edge point and improving the linewidth measurement accuracy.

Specifically, in the second sampling region, the second scanning treatment may sequentially be made downwards from a row of pixels where the fifth boundary H3 is located, and in scanning downwards, the scanning may be made progressively or in an interlaced manner, etc.

Within each row of pixels or a scanning row, when scanning is made from the seventh boundary V1 on the left to the eighth boundary V2 on the right, as shown in FIG. 4a, since a pixel that is passed through at the beginning is located outside the target connected region, a pixel value of the pixel point is the second pixel value, and in scanning toward the right, a first pixel whose pixel value is the first pixel value is determined as the third edge point P3. When scanning is made from the eighth boundary V2 on the right to the seventh boundary V1 on the left, as shown in FIG. 4a, since a pixel that is passed through at the beginning is located outside the target connected region, a pixel value of the pixel point is the second pixel value, and in scanning toward the left, a first pixel whose pixel value is the first pixel value is determined as the second edge point P2. A second center point $P_{(center)\ lower}$ of the first third point P3 and the second edge point P2 in a same row of pixels is determined, and when scanning is made from the second center point $P_{(center)\ lower}$ to the seventh boundary V1 on the left, as shown in FIG. 4a, since a pixel that is passed through at the beginning is located outside the target connected region, a pixel value of the pixel point is the second pixel value, and in scanning toward the left, a first pixel whose pixel value is the first pixel value is determined as the fourth edge point P4. When scanning is made from the second center point $P_{(center)\ lower}$ to the eighth boundary V2 on the right, as shown in FIG. 4a, since a pixel that is passed through at the beginning is located outside the target connected region, a pixel value of the pixel point is the second pixel value, and in scanning to the right, a first pixel whose pixel value is the first pixel value is determined as the first edge point P1.

Longitude coordinate of $P_{(center)\ lower}$ may be an average of the longitude coordinate of the third edge point P3 and the longitude coordinate of the second edge point P2 in the same row of pixels.

After the second scanning treatment of the second sampling region, the first edge point P1, the second edge point P2, the third edge point P3 and the fourth edge point P4 corresponding to a plurality of scanning rows may be obtained.

In practical applications, the sampling regions in the region connected image, such as the first sampling region and the second sampling region, may be preset or determined during the linewidth measurement, which is not limited in this disclosure.

In a specific implementation, the step in which the sampling region in the region connected image is determined may include following content. Firstly, overlapping coordinates $(O_x, O_y)$ of the first connected region and the second connected region are determined based on the region connected image, the overlapping coordinates are coordinates of an overlapping pixel O located in an overlapping region of the first connected region and the second connected region. Then, the first sampling region and the second sampling region may be determined according to the overlapping coordinates ($O_x$, $O_y$) and the ninth boundary H5 and the tenth boundary H6 of the region connected image which are oppositely arranged in the column direction.

As shown in FIG. 4a, the first dividing line H0 is a straight line passing through the overlapping pixel O and extending in the row direction, that is, a straight line passing through the overlapping pixel O and parallel to both the ninth boundary H5 and the tenth boundary H6.

The first boundary H1 is determined by translation of the ninth boundary H5 by a first preset distance in the column direction towards the overlapping pixel O. The second boundary H2 is determined by translation of a first dividing line H0 by a second preset distance in the column direction towards the ninth boundary H5. The fifth boundary H3 is determined by translation of the first dividing line H0 by a third preset distance in the column direction towards the tenth boundary H6. The sixth boundary H4 is determined by translation of the tenth boundary H6 by a fourth preset distance in the column direction towards the overlapping pixel O.

By setting the first boundary H1 to be determined by translation of the ninth boundary H5 by a first preset distance in the column direction towards the overlapping pixel O, it is possible to avoid extracting pixels on other sides (sides different from L1 and L2) of the first sub-connected region and pixels on other sides (sides different from L3 and L4) of the second sub-connected region, thus improving the accuracy of linewidth measurement. By setting The second boundary H2 to be determined by translation of a first dividing line H0 by a second preset distance in the column direction towards the ninth boundary H5, it may be ensured that the overlapping region of the first connected region and the second connected region is not included in the first sampling region, avoiding mutual interference between them and improving the accuracy of extraction of edge points.

By setting the sixth boundary H4 to be determined by translation of the tenth boundary H6 by a fourth preset distance in the column direction towards the overlapping pixel O, it is possible to avoid extracting pixels on other sides (sides different from L1 and L2) of the third sub-connected region and pixels on other sides (sides different from L3 and L4) of the fourth sub-connected region, thus improving the accuracy of linewidth measurement. By setting the fifth boundary H3 to be determined by translation of the first dividing line H0 by a third preset distance in the column direction towards the tenth boundary H6, it may be ensured that the overlapping region of the first connected region and the second connected region is not included in the second sampling region, thus avoiding mutual interference between them and improving the accuracy of extraction of the edge points.

Specific values of the first preset distance, the second preset distance, the third preset distance and the fourth preset distance may be determined according to resolution of the region connected images. For example, when the resolution of the region connected image is 480×640, in order to obtain a large sampling region, the first preset distance, the second preset distance, the third preset distance and the fourth preset distance may be set to be 10, 50, 10 and 50 pixels, respectively, of which specific values may be adjusted as required.

As shown in FIG. 4a, the third boundary and the seventh boundary are the same, both of which are left boundaries V1 of the region connected image. The third boundary and the seventh boundary may also be different, which is not limited in this disclosure. The fourth boundary and the eighth boundary are the same, both of which are right boundaries V2 of the region connected image. The fourth boundary and the eighth boundary may also be different, which is not limited in this disclosure.

In the practical applications, there are many methods to determine the overlapping coordinates ($O_x$, $O_y$), that is, the coordinates of an overlapping pixel O. In a first method, as shown in FIG. 4a, the region connected image further includes a reference boundary connecting the ninth boundary H5 with the tenth boundary H6. The reference boundary may be, for example, the left boundary of the region connected image, i.e., the boundary V1 extending in the column direction in FIG. 4a. An extension direction of the first line segment and/or the second line segment is different from the column direction. That is, the extension direction of at least one of the first line segment and the second line segment is different from the column direction.

Accordingly, a step in which overlapping coordinates of the first connected region and the second connected region are determined based on the region connected image may include following content. Progressive scanning is performed on the pixels in the region connected image from the ninth boundary H5. The progressive scanning includes: if a distance between a reference pixel of a current scanning row and the reference boundary V1 is greater than or equal to a distance between a reference pixel of a previous scanning row and the reference boundary V1, and greater than or equal to a distance between a reference pixel of a next scanning row and the reference boundary V1, determining coordinates of the reference pixel of the current scanning row as the overlapping coordinates. The reference pixel is a first pixel whose pixel value is the first pixel value in the same row of pixels, when scanning from the reference boundary V1.

When longitude coordinate of the reference boundary V1 is 0, the distance between the reference pixel and the reference boundary V1 is longitude coordinate of the reference pixel, that is, the coordinate in the row direction. Accordingly, the overlapping coordinates ($O_x$, $O_y$) are coordinates of a reference pixel with largest longitude coordinate.

Specifically, as shown in FIG. 4a, a pixel row where the ninth boundary H5 is located may be taken as the first scanning treatment row and in scanning from the reference boundary V1 to the right and during the scanning, a first pixel whose pixel value is the first pixel value is determined as a reference pixel of this scanning row, and the overlapping coordinates may also be temporarily stored as coordinates of the reference pixel of the first scanning treatment row. If longitude coordinate of a reference pixel of a second scanning treatment row is larger than that of the first scanning treatment row, the overlapping coordinates may be updated to coordinates of the reference pixel of the second scanning treatment row, and so forth. When the overlapping coordinates are coordinates of a reference pixel of a N-th scanning row and longitude coordinate of a reference pixel of a N+1-th scanning row is less than or equal to longitude coordinate of the reference pixel of the N-th scanning row, the coordinates of the reference pixel of the N-th scanning row may be determined as the finally determined overlapping coordinates. N is a positive integer.

In a second method, the step in which overlapping coordinates of the first connected region and the second connected region are determined based on the region connected image may include following content. Straight line detection is performed on pixels in the first connected region and the second connected region to obtain a plurality of detected line segments. The plurality of detected line segments are clustered to obtain two clusters. Coordinates of intersection of two line segments corresponding to cluster centers of the two clusters are determined as the overlapping coordinates.

Figure 5:
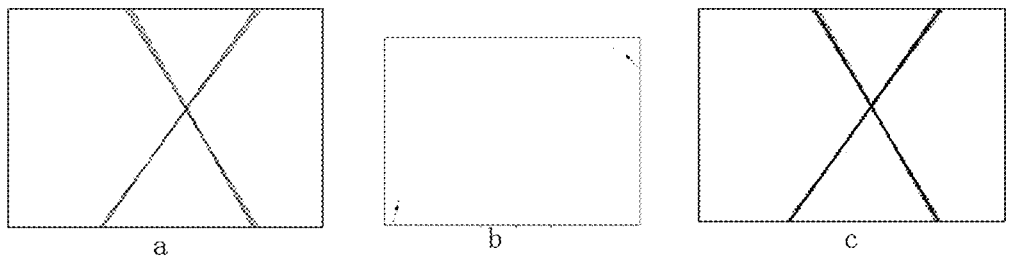
FIG. 5 schematically shows a process diagram of determining overlapping coordinates.

Referring to FIG. 5, a schematic diagram of a process of determining overlapping coordinates by clustering is schematically shown. Plan a in FIG. 5 shows a plurality of detected line segments obtained by the straight line detection, Plan b in FIG. 5 shows a result of clustering according to intercepts and slopes of the detected line segments, that is, two clusters obtained by clustering the detected line segments. Two thick black lines shown by plan c in FIG. 5 are two line segments corresponding to the cluster centers of the two clusters.

In a specific implementation, the straight line detection may be performed by using a Hough transform on the pixels in the first connected region and the second connected region, so as to obtain the plurality of detected line segments, as shown in plan a in FIG. 5. For each of the detected line segments, a set of parameters [rho, theta] is contained. The slope a and the intercept b of the detected line segment may be determined according to the parameter theta, with a=cos(theta) and b=sin(theta), so as to obtain another set of parameters [a, b] of the detected line segment. Then, the parameters [a, b] of the plurality of detected line segments may be clustered by k-means, with a number of cluster centers being set to 2, so as to obtain two clusters (as shown in B in FIG. 5), and slopes and intercepts of two line segments corresponding to the cluster centers of the two clusters, namely $[a_{k1}]$, $b_{k1}$, $[a_{k2}, b_{k2}]$. Then, according to a linear equation for these two line segments: $y=a_{k1}x+b_{k1}$ and $y=a_{k2}x+b_{k2}$, coordinates of the intersection, i.e., overlapping coordinates, may be obtained by solving the equation.

In this implementation, a step in which the width of the first line segment is determined according to the first edge point and the second edge point in step S14 may include following content. Straight line fitting is performed on a plurality of first edge points to obtain a first edge line L1. Straight line fitting is performed on a plurality of second edge points to obtain a second edge line L2. A first distance from the first edge point to the second edge line and a second distance from the second edge point to the first edge line are calculated. An average of the first distance and the second distance is calculated to obtain the width of the first line segment.

Before the step in which the width of the line is determined according to the width of the first line segment, step S14 may further include following content. Straight line fitting is performed on a plurality of third edge points to obtain a third edge line L3. Straight line fitting is performed on a plurality of fourth edge points to obtain a fourth edge line L4. A third distance from the third edge point to the fourth edge line and a fourth distance from the fourth edge point to the third edge line are calculated. An average of the third distance and the fourth distance is calculated to obtain the width of the second line segment.

Accordingly, the step in which the width of the line is determined according to the width of the first line segment in step S14 includes following content. The width of the line is determined according to the width of the first line segment and the width of the second line segment. The width of the line includes at least one of the following: an average of the width of the first line segment and the width of the second line segment, the width of the first line segment and the width of the second line segment.

A least square method may be adopted for straight line fitting.

Taking calculating the first distance from the first edge point on the first edge line L1 to the second edge line L2 as an example, the distance from the edge point to the edge line is calculated according to following formula:

$$d = \frac{|ax - y + b|}{\sqrt{a^2 + 1}}$$

where d represents the first distance, (x, y) is coordinates of the first edge point, and a and b are a slope and an intercept of the second edge line L2, respectively.

When the line includes a plurality of line segments, the width of the line may be an average of widths of the plurality of line segments:

$$d_{mean} = \frac{\sum_{i=0}^{n} d_i}{n},$$

where $d_{mean}$ is the width of the line, $d_i$ is a width of an i-th line segment, and n is a number of multiple line segments.

In the first sampling region or second sampling region described above, the connected region including both the first line segment and the second line segment may also include only one line segment connected region in a respective sampling region in the practical applications. Optionally, the first line segment includes a fifth branch line, and step S13 may include following content.

Figure 4B:
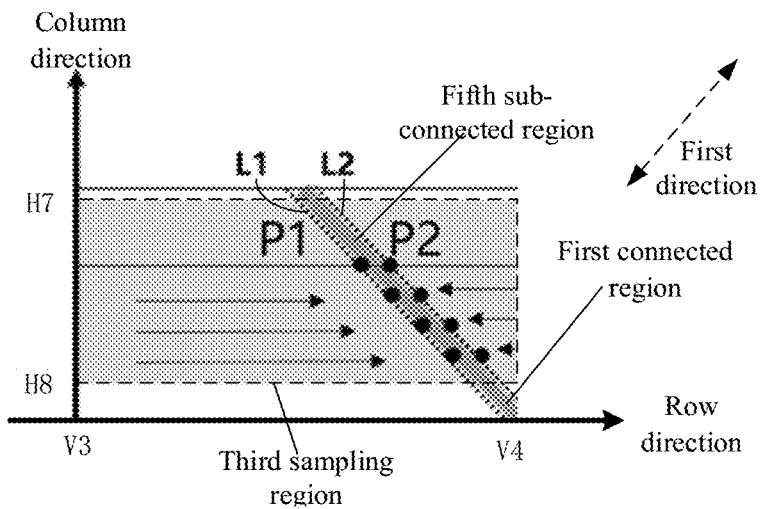
FIG. 4b schematically shows a diagram of another region connected image.

Firstly, a third sampling region in the region connected image is determined, as shown in FIG. 4b. The third sampling region includes an eleventh boundary H7 and a twelfth boundary H8 which are oppositely arranged in the column direction, and a thirteenth boundary V3 and a fourteenth boundary V4 which connect the eleventh boundary H7 and the twelfth boundary H8. A target connected region in the third sampling region only includes a fifth sub-connected region corresponding to the fifth branch line, and two oppositely arranged sides of the fifth sub-connected region in the first direction are connected with both the eleventh boundary H7 and the twelfth boundary H8.

Then, a third scanning treatment is performed on pixels in the third sampling region. The third scanning treatment process includes scanning from the thirteenth boundary V3 to the fourteenth boundary V4 in a same row of pixels, and determining a first pixel whose pixel value is the first pixel value as the first edge point P1; and scanning from the fourteenth boundary V4 to the thirteenth boundary V3, and determining a first pixel whose pixel value is the first pixel value as the second edge point P2.

It should be noted that in FIG. 4b, the target connected region is a dark gray region, that is, a pixel region corresponding to the first pixel value.

As shown in FIG. 4b, the two oppositely arranged sides L1 and L2 of the fifth sub-connected region in the first direction are respectively connected to the eleventh boundary H7 and connected to the twelfth boundary H8. By connecting the two oppositely arranged sides of the fifth sub-connected region in the first direction with the eleventh boundary H7 and connected to the twelfth boundary H8, it is possible to avoid extracting pixels on other sides of the first sub-connected region, thus improving the extraction accuracy of the first edge point and the second edge point and improving the linewidth measurement accuracy.

Specifically, in the third sampling region, the third scanning treatment may sequentially be made downwards from a row of pixels where the eleventh boundary H7 is located, and in scanning downwards, the scanning may be made progressively or in an interlaced manner, etc.

Within each row of pixels or a scanning row, when scanning is made from the thirteenth boundary V3 on the left to the fourteenth boundary V4 on the right, as shown in FIG. 4b, since a pixel that is passed through at the beginning is located outside the target connected region, a pixel value of the pixel point is the second pixel value, and in scanning toward the right, a first pixel whose pixel value is the first pixel value is determined as the first edge point P1. When scanning is made from the fourteenth boundary V4 on the right to the thirteenth boundary V3 on the left, as shown in FIG. 4b, since a pixel that is passed through at the beginning is located outside the target connected region, a pixel value of the pixel point is the second pixel value, and in scanning toward the left, a first pixel whose pixel value is the first pixel value is determined as the second edge point P2.

After the third scanning treatment process is performed on the third sampling region, the first edge point P1 and the second edge point P2 corresponding to a plurality of scanning rows may be obtained.

In the practical applications, if the line only includes one line segment, the first line segment may be this line segment. If the line includes a plurality of line segments which do not intersect with each other, the first line segment may be any one of the plurality of line segments which do not intersect with each other. Accordingly, the fifth branch line is all of the first line segment or a middle part of the first line segment which does not include both end points.

If the line includes a plurality of intersecting line segments, the first line segment may be any one of the plurality of intersecting line segments. Accordingly, the fifth branch line may be a part of the first line segment that does not include both end points and intersection points.

For example, when the line includes a first line segment and a second line segment that intersect with each other, the fifth branch line is equivalent to the first branch line described above, and the fifth sub-connected region is equivalent to the first sub-connected region described above. In this case, the third sampling region may be obtained by dividing the first sampling region by a second dividing line V0, as shown in FIG. 4a, the second dividing line V0 is a straight line passing through the overlapping coordinates ($O_x$, $O_y$) and extending in the column direction. Accordingly, the first boundary H1, the second boundary H2 and the third boundary V1 of the first sampling region described above may be used as the eleventh boundary H7, the twelfth boundary H8 and the thirteenth boundary V3 of the third sampling region in turn, and the fourteenth boundary V4 of the third sampling region may be the second dividing line V0.

The third sampling region and the third scanning treatment corresponding to FIG. 4b are applicable to width measurement of arbitrary shapes of lines, such as I-shaped, V-shaped, X-shaped and Y-shaped lines.

In an alternative implementation, a convolution kernel used in the expansion treatment is with a different size from a convolution kernel used in the corrosion treatment. Specifically, the convolution kernel used in the expansion treatment is smaller than the convolution kernel used in the corrosion treatment. In this case, the width of the first connected region in the connected image is less than the width of the first line segment.

Figure 6:
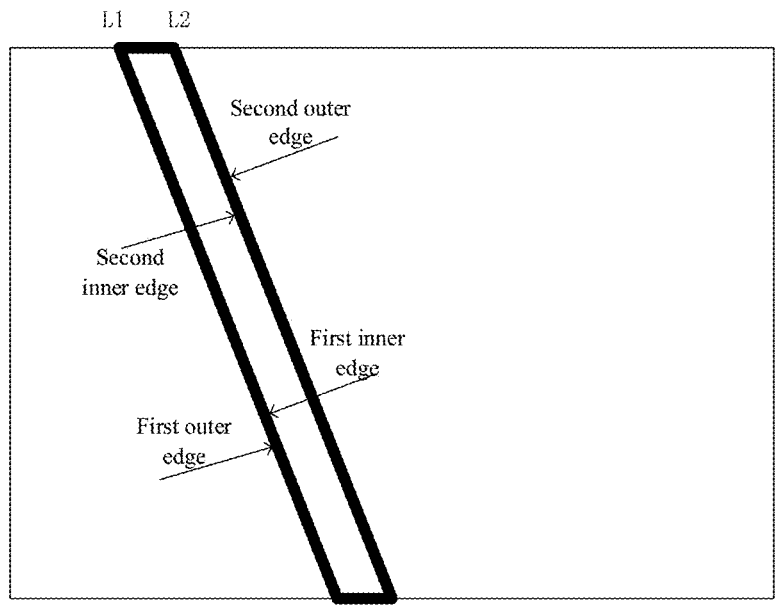
FIG. 6 schematically shows an inner edge and an outer edge of a line segment.

In this implementation, as shown in FIG. 6, the first edge line L1 includes a first outer edge line and a first inner edge line, and the second edge line L2 includes a second outer edge line and a second inner edge line. The target connected region includes a third connected region corresponding to the first line segment, and the convolution kernel used in the expansion treatment is smaller than the convolution kernel used in the corrosion treatment, so that one of two opposite sides of the third connected region in the first direction is located between the first outer edge line and the first inner edge line, and the other side of the two opposite sides is located between the second outer edge line and the second inner edge line.

For example, the convolution kernel used in the expansion treatment may be a size of 5×5, and the convolution kernel used in the corrosion treatment may be a size of 7×7, which is not limited in this disclosure.

The line may also include a second line segment that intersects with the first line segment, and the first line segment may include a sixth branch line located at one side of the intersection of the first line segment and the second line segment. Accordingly, after step S12, the method may further include extracting a skeleton image of the connected image. The skeleton image includes a skeleton, as shown by a white line in FIG. 12, a pixel value of each pixel in the skeleton are different from that of each pixel outside the skeleton, and the skeleton includes a center line corresponding to the sixth branch line.

Accordingly, before step S13, the method may further include performing straight line detection on the edge image to obtain a plurality of edge line segments. A target line segment corresponding to the sixth branch line is determined from the plurality of edge line segments.

Figure 11:
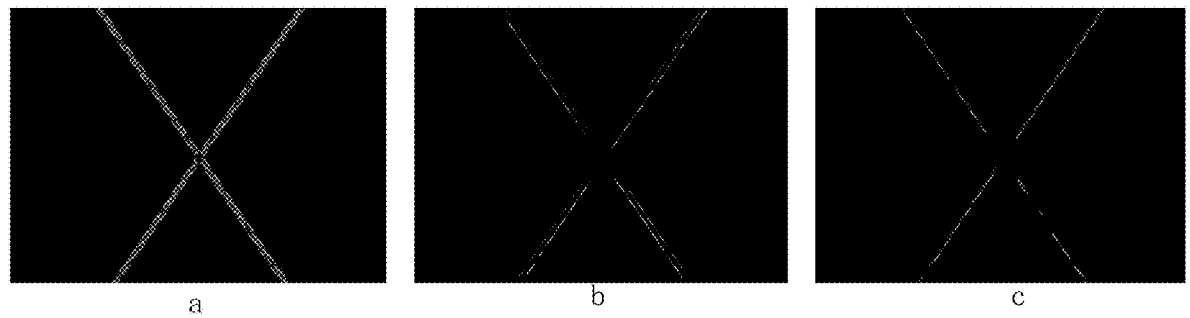
FIG. 11 schematically shows a diagram of an edge line segment, an outer edge line and an inner edge line.

Specifically, the straight line detection is performed on the edge image by using a Hough transform to obtain the plurality of edge line segments, as shown in plan a in FIG. 11, and a corresponding edge image is shown in plan in FIG. 8.

Because positions of edge line segments corresponding to a same branch line are close to each other, the plurality of edge line segments may be partitioned according to the positions of the edge line segments, so as to obtain the target segment corresponding to the sixth branch line.

It should be noted that the processing of all of branch lines in the line may be the same as that of the sixth branch line. Here, only the sixth branch line is taken as an example to illustrate the scheme. The branch line is a line segment at one side of the intersection, and the branch line does not include the intersection.

A number of zones may be the same as a number of branch lines included in the line, and each zone corresponds to a different branch line. For example, when a line pattern composed of the first line segment and the second line segment is V-shaped and contains two branch lines, the plurality of edge line segments may be divided into two regions. When the line pattern composed of the first line segment and the second line segment is Y-shaped, it contains three branch lines, so that the plurality of edge line segments may be divided into three regions. When the line pattern composed of the first line segment and the second line segment is X-shaped, it contains four branch lines, and the plurality of edge line segments may be divided into four regions.

Specifically, when the line pattern composed of the first line segment and the second line segment is X-shaped, intersection of the plurality of edge line segments may be determined firstly, and then the edge image may be divided into four regions according to coordinates of the intersection: an upper left region, a lower left region, an upper right region and a lower right region. In order to improve the accuracy of linewidth measurement, each region may not include the intersection and its adjacent region.

In the practical applications, each of the edge line segments may be traversed. If pixels on the edge line segment are located in a region corresponding to the sixth branch line, the edge line segment is the target line segment corresponding to the sixth branch line. In this embodiment, the region corresponding to the sixth branch line is taken as the upper left region for illustration, and the target line segment is the edge line segment located in the upper left region.

In the practical applications, average of slopes of all of target line segments may be calculated, and then difference between each of the target line segments and the average of slopes may be determined. If the difference is less than or equal to a specified value, the target line segment will be kept, otherwise, the target line segment will be removed.

It should be noted that when the line only includes one line segment, the processing of this line segment is the same as that of the sixth branch line. In this case, the plurality of edge line segments obtained through straight line detection may be taken as the target line segments.

Accordingly, step S13 may include following content. The first outer edge line, the first inner edge line, the second outer edge line and the second inner edge line are determined from the target line segments according to a relationship between a position of the target line segment in the edge image, a position of the third connected region in the region connected image and a position of the center line in the skeleton image.

A step in which the first outer edge line, the first inner edge line, the second outer edge line and the second inner edge line are determined from the target line segments according to a relationship between a position of the target line segment in the edge image, a position of the third connected region in the region connected image and a position of the center line in the skeleton image may include following content.

According to the position of the target line segment in the edge image, a first mapping region corresponding to the target line segment is determined at a corresponding position in the region connected image, and a second mapping region corresponding to the target line segment is determined at a corresponding position in the skeleton image.

Specifically, according to positions of two end points of the target line segment in the edge image, a first mapping region corresponding to the target line segment may be determined at the corresponding position in the region connected image, and the second mapping region corresponding to the target line segment is determined at the corresponding position in the skeleton image. Because a line segment may be determined with the two end points, a position of the target line segment in the edge image may be represented by the positions of the two end points of the target line segment, which may reduce computation load and improve measurement efficiency.

If the first mapping region is located at a first side outside the third connected region, the target line segment corresponding to the first mapping region is determined as the first outer edge line.

If the first mapping region is located at a second side outside the third connected region, the target line segment corresponding to the first mapping region is determined as the second outer edge line.

If the first mapping region is located within the third connected region and the second mapping region is located at a first side of the center line, target line segments corresponding to the first mapping region and the second mapping region are determined as the first inner edge line.

If the first mapping region is located within the third connected region and the second mapping region is located at a second side of the center line, target line segments corresponding to the first mapping region and the second mapping region are determined as the second inner edge line.

In this implementation, since one side of the two opposite sides of the third connected region in the first direction is located between the first outer edge line and the first inner edge line, and the other side of the two opposite sides is located between the second outer edge line and the second inner edge line, the target line segment may be determined as the inner edge line or the outer edge line of the first line segment according to a relationship between the first mapping region corresponding to the target line segment and the third connected region.

Specifically, if the first mapping region is located within the third connected region, the target line segment corresponding to the first mapping region is the inner edge line of the first line segment, and if the first mapping region is located outside the third connected region, the target line segment corresponding to the first mapping region is the outer edge line of the first line segment.

Figure 10:
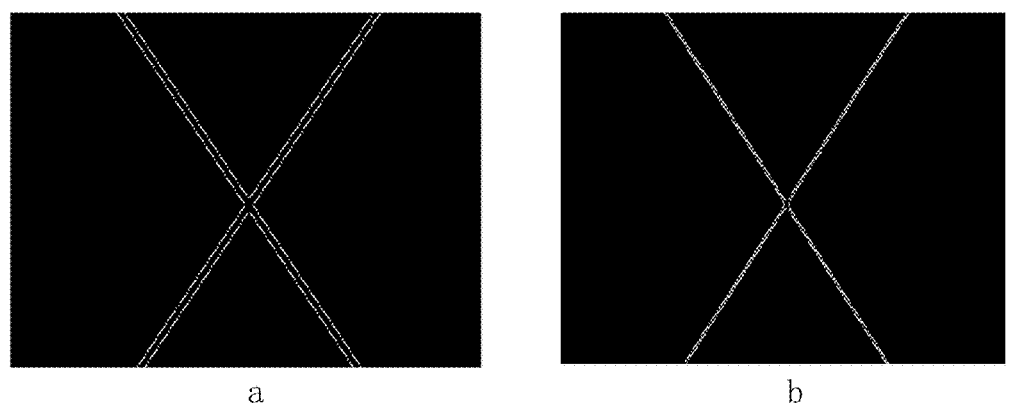
FIG. 10 schematically shows a diagram of results of screening outer edge pixels and inner edge pixels.

Plan a in FIG. 10 shows outer edge pixels obtained by screening the edge image using the target connected region. Plan b in FIG. 10 shows inner edge pixels obtained by screening the edge image using the target connected region. Plan b in FIG. 11 shows the outer edge line obtained by screening the plurality of edge line segments using the target connected region. Plan c in FIG. 11 shows the inner edge line obtained by screening the plurality of edge line segments using the target connected region.

Further, if the first mapping region is located at the first side outside the third connected region, the target line segment corresponding to the first mapping region is the first outer edge line. If the first mapping region is located at the second side outside the third connected region, the target line segment corresponding to the first mapping region is the second outer edge line.

After the inner edge lines are selected from the target line segment, the first inner edge line and the second inner edge line may be distinguished according to a positional relationship between the second mapping region corresponding to a respective inner edge line and the center line. Specifically, if the second mapping region is located at the first side of the center line, a corresponding inner edge line is the first inner edge line. If the second mapping region is located at the second side of the center line, the corresponding inner edge line is the second inner edge line.

In order to determine the positional relationship described above, in a first implementation, the region connected image may include a fifteenth boundary V5 and a sixteenth boundary V6 which are oppositely arranged, as shown by plan d in FIG. 7. The method may further include following content before the step in which the first outer edge line, the first inner edge line, the second outer edge line and the second inner edge line are determined from the target line segments according to a relationship between a position of the target line segment in the edge image, a position of the third connected region in the region connected image and a position of the center line in the skeleton image.

A pixel value of each pixel in a first filled region and a second filled region is set as the third pixel value. The first filled region is a region between the target connected region and the fifteenth boundary V5, and the second filled region is a region between the target connected region and the sixteenth boundary V6.

As shown by plan e in FIG. 7, the pixel value of each pixel in the target connected region (including the third connected region) is the first pixel value (such as 255), corresponding to a white region shown by plan d or e in FIG. 7. The pixel value of each pixel in the first filled region and the second filled region is the third pixel value (such as 64), corresponding to a gray region shown by plan e in FIG. 7. The pixel value of each pixel in other regions is the second pixel value (e.g., 0), corresponding to a black region shown by plan e in FIG. 7.

In a specific implementation, in order to set the pixel value of each pixel in the first and second filled regions as the third pixel values, each row of pixels in the region connected image (as shown in plan d in FIG. 7) may be traversed. For each row of pixels, the pixel value of each pixel in the row is traversed from the left (corresponding to V5 shown in FIG. 7) and the right (corresponding to V6 shown in FIG. 7) to the center, and a pixel value of a pixel point traversed before a first pixel whose pixel value is the first pixel value is set as the third pixel value, and traversing from the left and from the right is made with a same operation until a whole image is traversed, so as to obtain the image as shown in plan e in FIG. 7.

Then, in an upper left partition corresponding to the third connected region, pixel values of pixels at two sides outside the third connected region are different, with pixel values of pixels at one of the two sides being the second pixel value (corresponding to the black region shown by plan e in FIG. 7) and pixel values of pixels at the other of the two sides being the third pixel value (corresponding to the gray region shown by plan e in FIG. 7). Therefore, a positional relationship between the first mapping region and the third connected region may be determined according to the pixel value of each pixel in the first mapping region corresponding to the target line segment.

Specifically, if the pixel value of each pixel in the first mapping region is the third pixel value, it is determined that the first mapping region is located at the first side outside the third connected region. If the pixel value of each pixel in the first mapping region is the second pixel value, it is determined that the first mapping region is located at the second side outside the third connected region. If the pixel value of each pixel in the first mapping region is the first pixel value, it is determined that the first mapping region is located in the third connected region.

In this implementation, the fifteenth boundary V5 and the sixteenth boundary V6 are two boundaries of the region connected image which are oppositely arranged in the row direction, and in a specific implementation, these two boundaries may also be two boundaries of the region connected image which are oppositely arranged in the column direction.

In a second implementation, before the step in which the first outer edge line, the first inner edge line, the second outer edge line and the second inner edge line are determined from the target line segments according to a relationship between a position of the target line segment in the edge image, a position of the third connected region in the region connected image and a position of the center line in the skeleton image, the method may further include:

an exclusive-or operation is performed on the region connected image and the expanded image so as to obtain an intermediate image. The intermediate image includes a plurality of discrete complementary regions, a pixel value of each pixel in the plurality of discrete complementary regions is a fourth pixel value (e.g., 255, in a white region as shown in plan a in FIG. 9), a pixel value of each pixel outside the plurality of discrete complementary regions is a fifth pixel value (e.g., 0, in a black region as shown in plan a in FIG. 9), and the intermediate image includes a seventeenth boundary V7 and an eighteenth boundary V8 which are oppositely arranged; and a complementary region of the intermediate image adjacent to the seventeenth boundary V7 is determined as a third filling region, and a complementary region of the intermediate image adjacent to the eighteenth boundary V8 is determined as a fourth filling region, and a pixel value of each pixel in the third filling region and the fourth filling region is set as a sixth pixel value (e.g., 64, in a gray region shown by plan b in FIG. 9).

A third mapping region corresponding to the target line segment is determined at a corresponding position in the intermediate image according to the position of the target line segment in the edge image.

As shown in plan c in FIG. 8, the expanded image includes an expanded and connected region, and a pixel value of each pixel in the expanded and connected region is the first pixel value, and a pixel value of each pixel outside the expanded and connected region is the second pixel value. The exclusive-or operation is performed on the expanded image and the region connected image (as shown by plan e in FIG. 8) to obtain the intermediate image, as shown by plan a in FIG. 9, the exclusive-or operation may extract a region between a boundary of the target connected region and a boundary of the expanded connected region, that is, the complementary region (as shown by plan a in FIG. 9).

In this implementation, since one side of the two opposite sides of the third connected region in the first direction is located between the first outer edge line and the first inner edge line, and the other side of the two opposite sides is located between the second outer edge line and the second inner edge line, the target line segment may be determined as the inner edge line or the outer edge line of the first line segment according to a relationship between the third mapping region corresponding to the target line segment and the complementary region.

Specifically, if the third mapping region is located within the complementary region, the target line segment corresponding to the third mapping region is the outer edge line of the first line segment. If the third mapping region is located outside the complementary region, the target line segment corresponding to the third mapping region is the inner edge line of the first line segment.

Since the complementary region corresponding to the third connected region are located on two sides of the third connected region, respective outer edge lines may be divided into the first outer edge line and the second outer edge line according to complementary regions where the outer edge lines are located.

Figure 9:
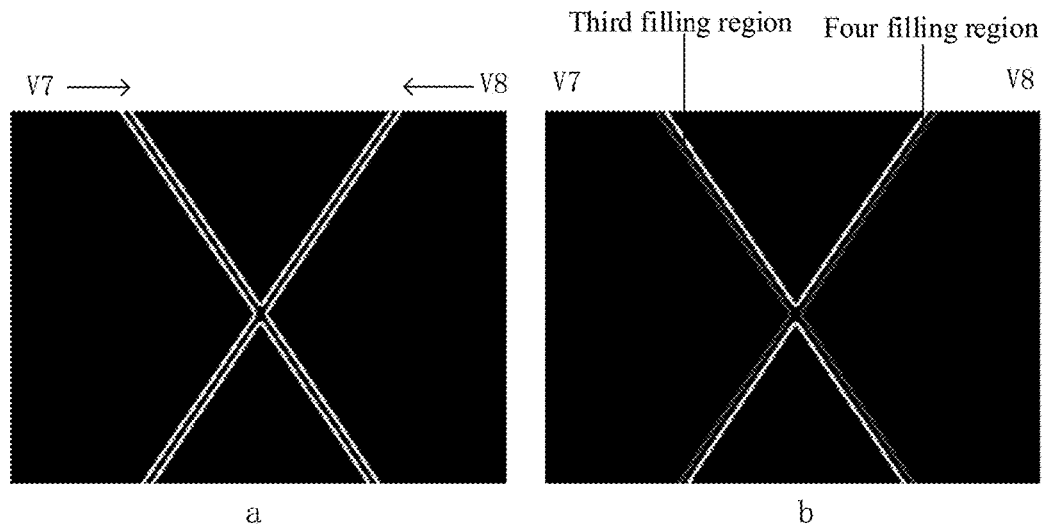
FIG. 9 schematically shows a diagram of results of an exclusive-or operation and filling on the connected image and the expanded image.

To determine which complementary region the respective outer edge lines belong to, pixels of the two complementary regions (located in an upper left region) corresponding to the third connected region may be set to be with different pixel values, as shown by plan b in FIG. 9, and pixel values of pixels in the two complementary regions in the upper left region are the fourth pixel value (in the white region as shown by b in FIG. 9) and the sixth pixel value (in the gray region as shown by b in FIG. 9), respectively.

In order to set a pixel value of each pixel in the third and fourth filled regions as the sixth pixel value, each row of pixels in the connected image may be traversed. For each row of pixels, a pixel value of each pixel in the row is traversed from the left (corresponding to V7 shown in plan a in FIG. 9) and the right (corresponding to V8 shown in plan a in FIG. 9) to the center, and when a first pixel whose pixel value is the fourth pixel value is encountered, a pixel value of each pixel in a region with pixel value being the fourth pixel value and where the first pixel is located is set as the sixth pixel value, and traversing from the left and from the right is made with a same operation until a whole image is traversed, so as to obtain the image as shown in plan b in FIG. 9.

After filling, a positional relationship between the first mapping region and the third connected region may be determined according to the pixel value of each pixel in the third mapping region corresponding to the target line segment.

Specifically, if the pixel value of each pixel in the third mapping region is the sixth pixel value, it is determined that the first mapping region is located at the first side outside the third connected region. If the pixel value of each pixel in the third mapping region is the fourth pixel value, it is determined that the first mapping region is located at the second side outside the third connected region.

In this implementation, the seventeenth boundary V7 and the eighteenth boundary V8 are two boundaries of the intermediate image that are oppositely arranged in the row direction, and in a specific implementation, these two boundaries may also be two boundaries of the intermediate image that are oppositely arranged in the column direction.

Figure 12:
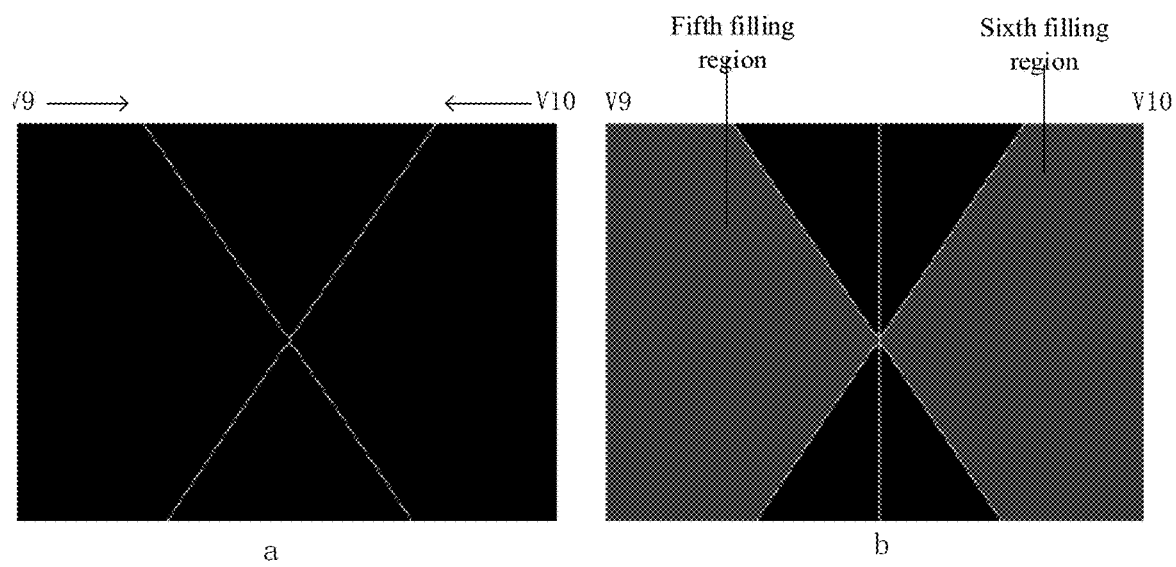
FIG. 12 schematically shows a diagram of a skeleton image and filling of the skeleton image.

In the third implementation, as shown in plan a in FIG. 12, the skeleton image includes a nineteenth boundary V9 and a twentieth boundary V10 which are oppositely arranged, a pixel value of each pixel in the skeleton is the seventh pixel value (e.g., 255, corresponding to a white line shown in plan a in FIG. 12), and a pixel value of each pixel outside the skeleton is the eighth pixel value (e.g., 0, corresponding to a black region shown in plan a in FIG. 12).

The method may further include following content before the step in which the first outer edge line, the first inner edge line, the second outer edge line and the second inner edge line are determined from the target line segments according to a relationship between a position of the target line segment in the edge image, a position of the third connected region in the region connected image and a position of the center line in the skeleton image.

A pixel value of each pixel in a region (a fifth filled region) located between the skeleton and the nineteenth boundary V9 and a region (a sixth filled region) located between the skeleton and the twentieth boundary V10 in the skeleton image is set as a ninth pixel value (e.g., 64, corresponding to the gray region shown by plan b in FIG. 12).

In order to determine whether the second mapping region is located at the first side or the second side of a center line, pixels on two sides of the center line in the upper left region where the third connected region is located may be set with different pixel values. Specifically, each row of pixels in the connected image may be traversed. For each row of pixels, a pixel value of each pixel in the row is traversed from the left (corresponding to V9 shown in plan a in FIG. 12) and the right (corresponding to V10 shown in plan a in FIG. 12) to the center, and when a first pixel whose pixel value is the seventh pixel value is encountered, a traversed pixel value is set as the ninth pixel value, and traversing from the left and from the right is made with a same operation until a whole image is traversed, so as to obtain the image as shown in plan b in FIG. 12.

After filling, it may be determined whether the second mapping region is located at the first side or the second side of the center line according to the pixel value of each pixel in the second mapping region. Specifically, if the pixel value of each pixel in the second mapping region is the ninth pixel value, it is determined that the second mapping region is located at the first side of the center line. If the pixel value of each pixel in the second mapping region is the eighth pixel value, it is determined that the second mapping region is located at the second side of the center line.

In this implementation, the nineteenth boundary V9 and the twentieth boundary V10 are two boundaries of the skeleton image that are oppositely arranged in the row direction, and in a specific implementation, these two boundaries may also be two boundaries of the skeleton image that are oppositely arranged in the column direction.

In this implementation, in step S14, the step in which the width of the first line segment is determined according to the first edge point and the second edge point may include following content. A fifth distance from an end point of the first outer edge line to the second outer edge line is calculated. A sixth distance from an end point of the second outer edge line to the first outer edge line is calculated. A seventh distance from an end point of the first inner edge line to the second inner edge line is calculated. An eighth distance from an end point of the second inner edge line to the first inner edge line is calculated. An average of the fifth distance, the sixth distance, the seventh distance and the eighth distance is calculated to obtain the width of the first line segment.

In order to obtain appropriate exposure dose and improve the accuracy of linewidth measurement, a value of an exposure dose may be adjusted through experiments, and then an average of ratios of predicted distances (linewidth) of a picture taken before and after the experiments may be calculated.

Specifically, the predicted average before the experiments is:

$$d' = \frac{1}{m} \sum_{j=1}^{m} \frac{1}{d} \left( \frac{1}{n} \sum_{i=1}^{n} d_{pred}^{i} \right)$$

where d is a standard value, $$\frac{1}{n} \sum_{i=1}^{n} d_{pred}^{i}$$

is an average of predicted distances of all of pictures with a same exposure dose. $d_{pred}^{i}$ is a predicted distance of a i-th picture, n is a number of pictures with the same exposure dose, and m is a number of exposure doses.

The average of the ratios of predicted distances (linewidth) of a picture taken before and after the experiments is as follows:

$$eval = \frac{1}{k}\sum_{k=1}^{K}\frac{1}{d'}\left(d_{pred}^{k}\right)$$

where K is an amount of picture data. In the practical applications, it may be determined whether adjustment of the exposure dose is appropriate according to a value of eval.

In this embodiment, the target image may be grayed and then binarized to obtain a binary image. In binarization, a binarization threshold may be determined firstly, and a pixel value of a pixel whose pixel value is less than the binarization threshold is set as a minimum gray value such as 0, and a pixel value of a pixel whose pixel value is greater than or equal to the binarization threshold is set as a maximum gray value such as 255.

In a specific implementation, the binarization threshold may be determined by a gray average method, a percentage threshold method, a threshold method based on a valley floor minimum value, a method for iteratively determining an optimum threshold based on a bimodal average, an Otsu method or the like. However, the applicant found that a threshold determination method only using binarization has poor processing effect on images with much noise and various illumination.

In order to obtain a more accurate binarization threshold, binarization may be performed based on a green channel image of the target image according to characteristics of the image itself, such as an overall greenish target image.

Figure 13:
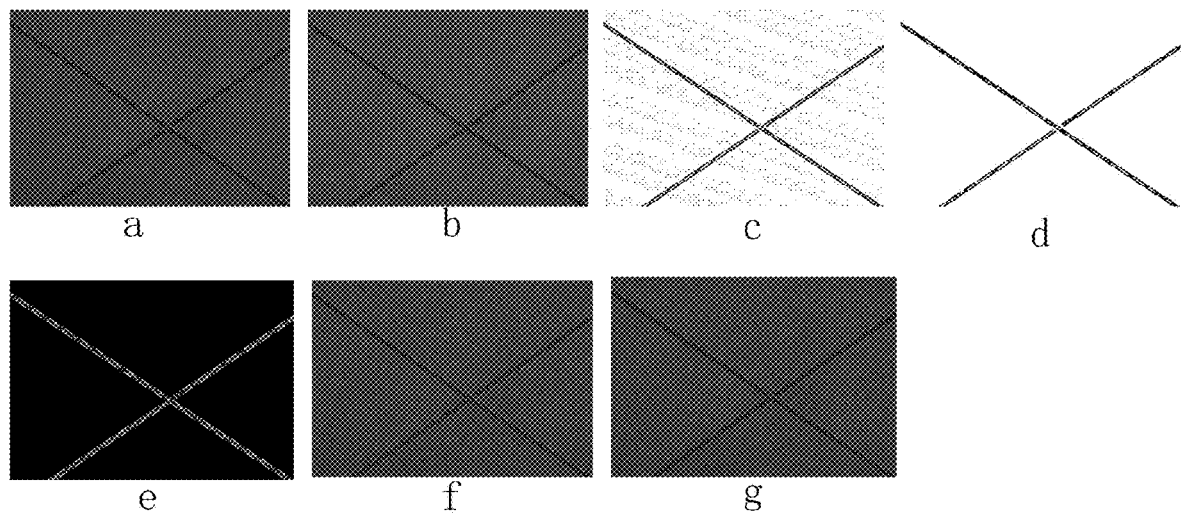
FIG. 13 schematically shows a diagram of an image during processing.
Figure 14:
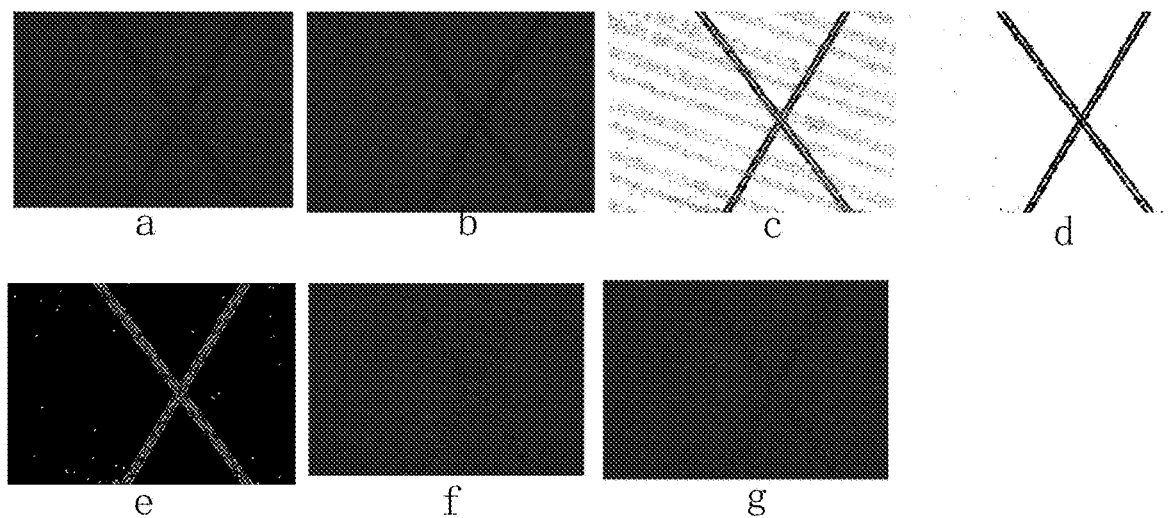
FIG. 14 schematically shows a diagram of another image during processing.

Plan a in FIG. 13 shows a greenish target image, and plan b shows a green channel image of the target image. Plan a in FIG. 14 shows another greenish target image, and plan b shows a green channel image of the target image.

Specifically, a step in which the binarization threshold is determined based on the G channel (green channel) image of the target image may include following content. A first threshold is determined using the Otsu method. A second threshold is determined according to a proportion of the line pattern in the target image, and thus according to the proportion and a pixel value of each pixel in the line pattern. The first threshold and the second threshold are weighted and summed to obtain a binary threshold.

The Otsu method is an algorithm to determine a threshold for image binarization, also known as a maximum between-cluster variance method. After binarizing the image according to the threshold obtained by the Otsu method, variance between foreground and background images is the largest. The Otsu method is considered to be an optimal algorithm for selecting the threshold in image segmentation, which is simple in calculation and not affected by image brightness and contrast, and thus has been widely used in digital image processing. The Otsu method divides an image into two parts: the background image and the foreground image according to gray characteristics of the image. Variance is a measure of uniformity of a gray distribution. The larger the variance between the background and the foreground, the greater intra-class variance between the two parts of the image, the more the two parts are different from each other. When a part of the foreground is mistakenly taken as the background or a part of the background is mistakenly taken as the foreground, difference between the two parts may become smaller. Therefore, segmentation that maximizes the intra-class variance means minimum probability of misclassification.

In a process of determining the second threshold, for example, when a proportion of the line pattern in the target image is 8%, the pixel value of each pixel in the line pattern may be sorted according to an order from the largest to the smallest, and then a ratio of a number of pixels with pixel values between an intermediate value and a maximum pixel value to a number of all of pixels may be calculated. When the ratio is 8%, the intermediate value may be determined as the second threshold.

When the target image is with much noise, the binarization threshold may be calculated according to following formula:

$$t = w_1 \times t_1 + w_2 \times t_2$$

where $t_1$ is the first threshold, $w_1$ is a weight of the first threshold, $t_2$ is the second threshold, $w_2$ is a weight of the second threshold, and t is the binarization threshold.

Referring to plan c in FIG. 13 and plan c in FIG. 14, respectively, the binary images obtained by the method described above are shown. Plan c in FIG. 13 shows a binary image obtained by binarizing the green channel image shown in plan b in FIG. 13. Plan c in FIG. 14 shows a binary image obtained by binarizing the green channel image shown in plan b in FIG. 14.

The binarization method described above selects the green channel image based on the characteristics of the image itself, and combines the Otsu method and the proportion of the line in the image to calculate the binarization threshold, which may reduce influence of different brightness of the image, reduce noise of the binary image, and improve quality of the binary image.

It should be noted that when the target image is reddish, the binarization may be performed based on a red channel of the target image. When the target image is blueish, the binarization may be performed based on a blue channel of the target image.

In this embodiment, median filtering may be used to denoise the image. Median Filtering is a nonlinear signal processing technology based on sorting statistics theory, which may effectively suppress noise. A basic principle of the median filtering is to replace a value of a pixel in a digital image or digital sequence with a median of values of respective pixels in a neighborhood of the pixel, so that surrounding pixel values are close to the real values, thus removing isolated noise points. A specific process is to sort pixels in a two-dimensional sliding template with a certain structure according to amplitudes of pixel values by using the template, so as to generate a monotonically rising (or falling) two-dimensional data sequence. An output of a two-dimensional median filtering is as follows.

$$g(x, y) = med\,(f(x-k, y-l)), (k, l \in W)$$

Where f(x, y), g(x, y) represent the image before and after processing, respectively, (x, y) represents pixel coordinates in the image, and W is a two-dimensional template, with a size of 3×3 or 5×5 and a shape of rectangle, line, circle, cross, ring or the like.

In the practical applications, the median filtering described above may be used to denoise the binary image, so as to obtain the denoised image. Plan d in FIG. 13 shows a denoised image obtained by median filtering the binary image shown in plan c in FIG. 13. Plan d in FIG. 14 shows a denoised image obtained by median filtering the binary image shown in plan c in FIG. 14.

In this embodiment, a Canny edge detection operator may be used to perform edge detection on the image. The Canny edge detection operator is a multi-level detection algorithm, and its criteria for edge detection are as follows: (1) Edge detection with a low error rate: the detection algorithm should accurately find as many edges in the image as possible, so as to minimize missed and false detections. (2) Optimal positioning: detected edge points should be accurately positioned at a center of the edge. (3) Any edge in the image should be marked only once, with no false edge generated by image noise.

A step in which the Canny edge detection operator may be used to perform edge detection on the image may include following content. The image is smoothed by a Gaussian filter. An amplitude and a direction of gradient are calculated using finite difference of a first partial derivative. Non-maximum suppression is performed on the amplitude of the gradient. Edges are detected and connected by using a double threshold algorithm.

In the practical applications, the edges of the denoised image may be extracted by using the Canny edge detection operator. Plan e in FIG. 13 shows an edge image obtained by edge extraction of the denoised image shown in d in FIG. 13. Plan e in FIG. 14 shows an edge image obtained by edge extraction of the denoised image shown in d in FIG. 14.

Straight line detection of the edge image may be classified into two modes: top-down and bottom-up modes. The top-down straight line detection mode includes the Hough transform, which transforms the straight line from a coordinate space to a parameter space, and then votes to detect the straight line. The bottom-up line detection mode includes chain code tracking, phase grouping and the like. The bottom-up straight line detection mode mainly detects short lines, which may be clustered into a long straight line by clustering.

A step in which the straight line detection is performed on the edge image by using the Hough transform may include following steps 1 to 5.

In step 1, a feature point is randomly extracted in the image, namely an edge point, and if the point has been calibrated as a point on a certain straight line, an edge point is continuously randomly extracted from remaining edge points until all of edge points are extracted.

In step 2, the Hough transform is performed on the point, and cumulative calculation is carried out.

In step 3, a largest point in Hough space is selected, and if the point is greater than a specified threshold, step 4 is performed, otherwise, return to step 1.

In step 4, two end points of the straight line are found by moving along a direction of the straight from this point according to a maximum value obtained by the Hough transform.

In step 5, a length of the straight line is calculated, a straight line whose length meets preset conditions are output, and then return to step 1.

In the practical applications, the above-described Hough transform steps may be adopted to perform straight line detection on the edge images in FIGS. 13 and 14. Plan f in FIG. 13 shows a straight line image obtained by performing straight line detection on the edge image shown by plan e in FIG. 13. Plan f in FIG. 14 shows a straight line image obtained by performing straight line detection on the edge image shown by plan e in FIG. 14.

Afterwards, the width of the line may be determined according to the straight line in the straight line image. Specific steps may include following content. All of the straight lines detected by the Hough transform is fitted with the least square method to obtain a reference slope k (for cases shown in FIG. 13 and FIG. 14, two reference slopes are obtained, which correspond to two intersecting line segments). A slope and an intercept of a respective straight line detected by the Hough transform are calculated. Straight lines with slopes less than k−t or greater than k+t are filtered out, that is, straight lines with slopes greater than or equal to k−t and less than or equal to k+t are taken as target straight lines, t is a slope threshold, which may be preset empirically. Then, a hierarchical clustering algorithm may be used to cluster intercepts of the target straight lines to obtain mutually parallel target straight lines (for the cases shown in FIG. 13 and FIG. 14, four intercepts are obtained by clustering, and two groups of mutually parallel target straight lines are obtained). Afterwards, a distance between the parallel target lines may be calculated, so as to obtain the width of the line.

Plan g in FIG. 13 shows an image of mutually parallel target straight lines obtained by clustering straight lines indicated in plan f in FIG. 13. Plan g in FIG. 14 shows an image of mutually parallel target straight lines obtained by clustering straight lines indicated in plan f in FIG. 14.

In the least square method, a straight line fitting is performed according to following formula.

$$\text{Standard value} = \sum (\text{Observed value} - \text{Theoretical value})^2$$

The observed value is from pixels forming a straight line, and the theoretical value is from assumed fitting functions.

Hierarchical clustering is a kind of clustering algorithm in which a hierarchical nested clustering tree is created by calculating similarity between different categories of data points. In the clustering tree, a lowest level of the tree is composed of different categories of original data points, and a top level of the tree is a root node of a cluster. There are two methods to create the clustering tree: bottom-up merging and top-down splitting.

In this way, the Hough transform, the least square method and the hierarchical clustering are combined for straight line detection, which improves accuracy of edge line detection.

Figure 15:
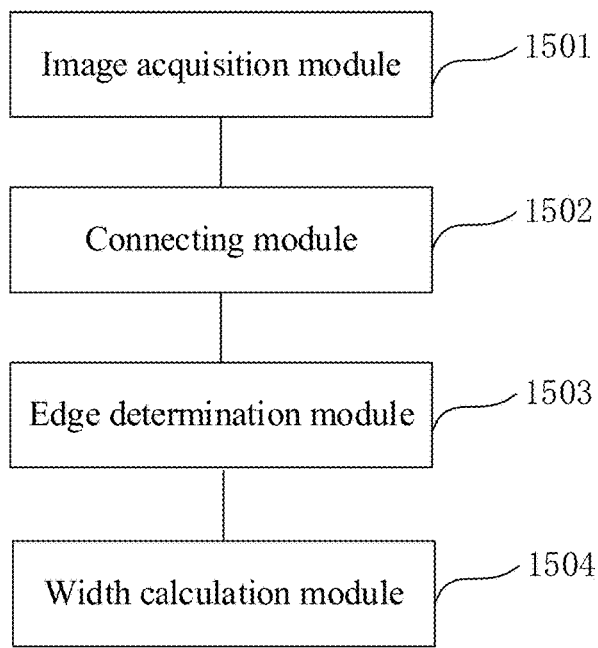
FIG. 15 schematically shows a block diagram of a linewidth measurement apparatus.

FIG. 15 schematically shows a block diagram of a linewidth measurement apparatus for measuring the width of the line. Referring to FIG. 15, it may include an image acquisition module 1501, a connecting module 1502, an edge determination module 1503 and a width calculation module 1504.

The image acquisition module 1501 is configured to obtain a target image of the line, and the line includes a first line segment.

The connecting module 1502 is configured to perform region connecting on an edge image or binary image of the target image to obtain a region connected image. The edge image is an image obtained by edge detection of the target image, the binary image is an image obtained by image binarization of the target image, and the region connected image includes a target connected region corresponding to a pattern of the line, and a pixel value of each pixel in the target connected region is different from that of each pixel outside the target connected region.

The edge determination module 1503 is configured to determine a first edge point and a second edge point of the first line segment based on the region connected image. The first edge point is located on a first edge line of the first line segment, the second edge point is located on a second edge line of the second line segment, and the first edge line and the second edge line are oppositely arranged in a first direction.

The width calculation module 1504 is configured to determine a width of the first line segment according to the first edge point and the second edge point, and determine the width of the line according to the width of the first line segment.

With regard to the apparatus in the above embodiment, specific ways respective module performs operations has been described in detail in the embodiments of the linewidth measurement method, for example, it is implemented in software, hardware, firmware, etc., which will not be described in detail here.

The above-described apparatus embodiments are only schematic, in which units described as separate components may or may not be physically separated, and the components shown as the units may or may not be physical units, that is, they may be located in one place or distributed over multiple network units. Some or all of the modules may be selected according to actual needs to achieve purposes of this embodiment. The embodiments may be understood and implemented by the ordinary skilled in the art without paying creative labor.

Various component embodiments disclosed herein may be implemented in hardware, or in software modules executed on one or more processors, or in a combination thereof. It should be understood by those skilled in the art that some or all of functions of some or all of the components in the computing processing device according to the embodiments of the present disclosure may be realized in practice by using a microprocessor or a digital signal processor (DSP). The present disclosure may also be implemented as device or apparatus programs (e.g., computer programs and computer program products) for performing part or all of the methods described herein. Such programs for realizing the present disclosure may be stored on a computer readable medium, or may be in a form of one or more signals. Such signals may be downloaded from Internet websites, or provided on carrier signals, or provided in any other form.

Figure 16:
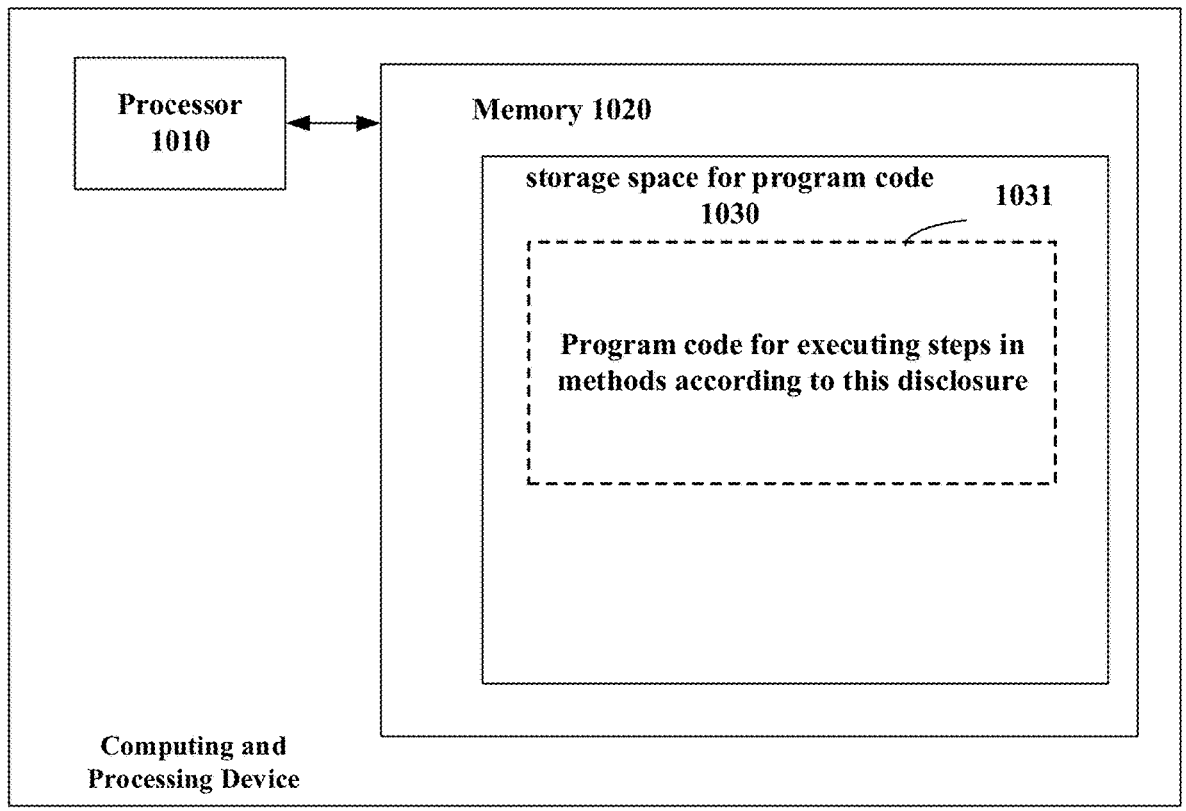
FIG. 16 schematically shows a block diagram of a computing processing device for executing the method according to the present disclosure.
Figure 17:
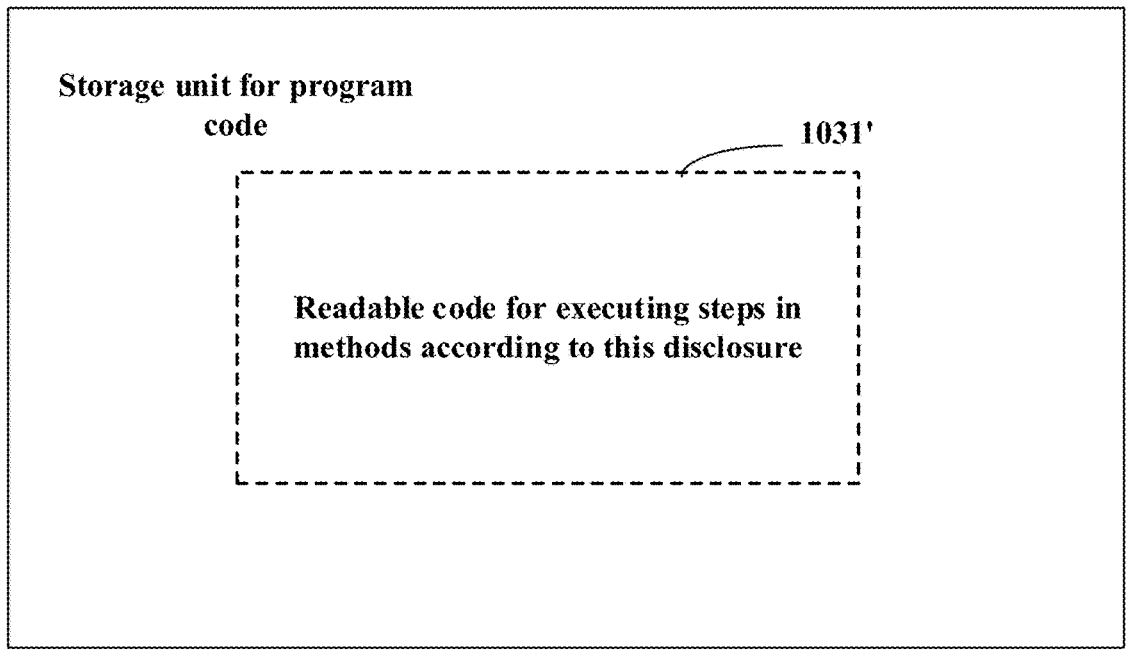
FIG. 17 schematically shows a storage unit for holding or carrying program codes for implementing the method according to the present disclosure.

For example, FIG. 16 shows a computing processing device that may implement the methods according to the present disclosure. The computing processing device conventionally includes a processor 1010 and a computer program product or a computer readable medium in a form of a memory 1020. The memory 1020 may be an electronic memory such as a flash memory, an EEPROM (electrically erasable programmable read only memory), an EPROM, a hard disk or a ROM. The memory 1020 has a storage space 1030 for program codes 1031 for executing any of steps in the above methods. For example, the storage space 1030 for program codes may include various program codes 1031 for implementing various steps in the above method, respectively. These program codes may be read from or written into one or more computer program products. These computer program products include program code carriers such as hard disks, compact disks (CD), memory cards or floppy disks. Such computer program products are usually portable or fixed storage units as described with reference to FIG. 17. The memory unit may have memory segments, memory spaces, and the like arranged similarly to the memory 1020 in the computing processing device of FIG. 16. The program may be compressed in an appropriate form, for example. Generally, the storage unit includes computer readable codes 1031', i.e., codes that may be read by, for example, a processor such as 1010, which, when executed by a computing processing device, causes the computing processing device to perform various steps in the methods described above.

All the embodiments in this specification are described in a progressive way, and each embodiment focuses on differences from other embodiments. The same and similar parts among the embodiments may be referred to each other.

Finally, it should be noted that in this document, relational terms such as "first" and "second" are only used to distinguish one entity or operation from another entity or operation, and do not necessarily require or imply any such actual relationship or sequence among these entities or operations. Moreover, terms "comprising", "including" or any other variation thereof are intended to encompass a non-exclusive inclusion, so that a process, method, article or device including a series of elements includes not only those elements, but also other elements not explicitly listed, or elements inherent to such a process, method, article or device. Without further restrictions, an element defined by the statement "includes a . . . " does not exclude presence of other identical elements in the process, method, article or apparatus including the element.

The linewidth measurement method and apparatus, the computing processing device, the computer program and the computer readable medium according to the disclosure are introduced in detail in the above. In this document, specific examples are used to explain principle and implementations of the disclosure. Explanations of the embodiments described above are only used to facilitate understanding of methods and core ideas of the disclosure. Meanwhile, changes may be made to the specific implementation and application scope by ordinary skilled in the art according to the ideas of this disclosure. To sum up, contents of this specification should not be construed as limitation to this disclosure.

It should be understood that although respective steps in the flowchart of the figures are shown in sequence as indicated by arrows, these steps are not necessarily executed in sequence as indicated by the arrows. Unless explicitly stated in this document, execution of these steps is not strictly limited in order, and may be made in other order. Moreover, at least a part of the steps in the flowcharts of the figures may include a plurality of sub-steps or stages. These sub-steps or stages are not necessarily completed at the same time, but may be executed at different times, and their execution is not necessarily sequential, but may be made alternately or alternatively with other steps or at least a part of sub-steps or stages of the other steps.

Other embodiments of the present disclosure will readily occur to those skilled in the art with considering the specification and practicing the disclosure provided herein. This disclosure is intended to cover any variations, uses or adaptations of this disclosure, which follow general principles of this disclosure and include common knowledge or customary practice in the art not provided in this disclosure. The specification and embodiments are regarded to be exemplary only, and a true scope and spirit of the present disclosure are indicated by following claims.

It should be understood that the present disclosure is not limited to a precise structure described above and shown in the drawings, and various modifications and changes may be made without departing from its scope. The scope of this disclosure is limited only by appended claims.

Reference to "one embodiment", "an embodiment" or "one or more embodiments" herein means that a specific feature, structure or characteristic described in connection with embodiments is included in at least one embodiment of the present disclosure. In addition, it is noted that an example of a word "in one embodiment" here do not necessarily refer to a same embodiment.

In the specification provided here, numerous specific details are set forth. However, it can be understood that the embodiments of the present disclosure may be practiced without these specific details. In some instances, well-known methods, structures and techniques have not been shown in detail in order not to obscure understanding of this specification.

In the claims, any reference signs between parentheses shall not be construed as limitations on the claims. A word "comprising" does not exclude presence of elements or steps not listed in a claim. A word "a" or "an" preceding an element does not exclude presence of a plurality of such elements. The present disclosure may be realized by means of hardware including several different elements and by means of a suitably programmed computer. In a unit claim enumerating several devices, several of these devices may be embodied by a same item of hardware. Use of words "first", "second", "third", etc. does not indicate any order. These words may be interpreted as names.

Finally, it should be noted that the above embodiments are only intended to illustrate technical schemes of the present disclosure, but not to limit it. Although the present disclosure has been described in detail with reference to the foregoing embodiments, it should be understood by ordinary skilled in the art that modifications may be made to the technical schemes described in the foregoing embodiments, or equivalent substitutions may be made to some technical features thereof. These modifications or substitutions do not make essence of corresponding technical schemes depart from the spirit and scope of the technical schemes of the embodiments of this disclosure.

The invention claimed is:

1. A linewidth measurement method, for measuring a width of a line, comprising:
   obtaining a target image of the line, wherein the line comprises a first line segment;
   performing region connecting on an edge image or binary image of the target image to obtain a region connected image, wherein the edge image is an image obtained by edge detection of the target image, the binary image is an image obtained by image binarization of the target image, and the region connected image comprises a target connected region corresponding to a pattern of the line, and a pixel value of each pixel in the target connected region is different from that of each pixel outside the target connected region;
   determining a first edge point and a second edge point of the first line segment based on the region connected image, wherein the first edge point is located on a first edge line of the first line segment, the second edge point is located on a second edge line of the second line segment, and the first edge line and the second edge line are oppositely arranged in a first direction; and
   determining a width of the first line segment according to the first edge point and the second edge point, and determining the width of the line according to the width of the first line segment,
   wherein the target connected region comprises a first connected region corresponding to the first line segment, and determining the first edge point and the second edge point of the first line segment based on the region connected image comprises:
   extracting pixels on two opposite sides of the first connected region in the first direction to obtain the first edge point and the second edge point; and
   wherein the line further comprises a second line segment which intersects with the first line segment, and the first line segment comprises a first branch line located at one side of an intersection of the first line segment and the second line segment, and the second line segment comprises a second branch line located at one side of the intersection, and a plurality of pixels of the region connected image are arrayed in array in a row direction and in a column direction, extracting pixels on two opposite sides of the first connected region in the first direction to obtain the first edge point and the second edge point comprises:
   determining a sampling region in the region connected image, wherein the sampling region comprises a first sampling region, the first sampling region comprises a first boundary and a second boundary which are oppositely arranged in the column direction, and a third boundary and a fourth boundary which connect the first boundary with the second boundary, a target connected region in the first sampling region comprises a first sub-connected region corresponding to the first branch line and a second sub-connected region corresponding to the second branch line, two oppositely arranged sides of the first sub-connected region in the first direction and two oppositely arranged sides of the second sub-connected region in the second direction are connected with both the first boundary and the second boundary, and the first sub-connected region is located at a side of the second sub-connected region close to the third boundary; and
   performing a first scanning treatment on pixels in the first sampling region, wherein the first scanning treatment comprises: scanning from the third boundary to the fourth boundary in a same row of pixels, and determining a first pixel whose pixel value is the first pixel value as the first edge point; scanning from the fourth boundary to the third boundary, and determining a first pixel whose pixel value is the first pixel value as a fourth edge point of the second line segment; determining a first center point of the first edge point and the fourth edge point in the same row of pixels; scanning from the first center point to the third boundary, and determining a first pixel whose pixel value is the first pixel value as the second edge point; scanning from the first center point to the fourth boundary, and determining a first pixel whose pixel value is the first pixel value as the third edge point of the second line segment;
   wherein the third edge point is located on a third edge line of the second line segment, the fourth edge point is located on a fourth edge line of the second line segment, and the third edge line and the fourth edge line are oppositely arranged in the second direction.

2. The linewidth measurement method according to claim 1, wherein performing region connecting on an edge image or binary image of the target image to obtain a region connected image comprises:
   performing expansion treatment and flood filling treatment sequentially on the edge image or the binary image to obtain an expanded image;
   performing corrosion treatment on the expanded image to obtain a corroded image, wherein the corroded image comprises a plurality of connected regions, a pixel value of each pixel in the plurality of connected regions is a first pixel value, and a pixel value of each pixel outside the plurality of connected regions is a second pixel value, the plurality of connected regions comprises isolated connected regions and the target connected region, the isolated connected regions are connected regions with an area less than a preset threshold, and the target connected regions are connected regions with an area greater than or equal to the preset threshold; and setting a pixel value of each pixel in the isolated connected regions in the corroded image to be the second pixel value so as to obtain the region connected image.

3. The linewidth measurement method according to claim 2, wherein a convolution kernel used in the expansion treatment is with a same size as a convolution kernel used in the corrosion treatment.

4. The linewidth measurement method according to claim 1, wherein the first line segment further comprises a third branch line located at the other side of the intersection, and the second line segment further comprises a fourth branch located at the other side of the intersection; the sampling region further comprises a second sampling region, the second sampling region comprises a fifth boundary and a sixth boundary which are oppositely arranged in the column direction, and a seventh boundary and an eighth boundary which connect the fifth boundary with the sixth boundary; a target connected region in the second sampling region comprises a third sub-connected region corresponding to the third branch line and a fourth sub-connected region corresponding to the fourth branch line, two oppositely arranged sides of the third sub-connected region in the first direction and two oppositely arranged sides of the fourth sub-connected region in the second direction are connected with both the fifth boundary and the sixth boundary, and the third sub-connected region is located at a side of the fourth sub-connected region close to the eighth boundary;

extracting pixels on two opposite sides of the first connected region in the first direction to obtain the first edge point and the second edge point further comprises:

performing a second scanning treatment on pixels in the second sampling region, wherein the second scanning treatment comprises: scanning from the seventh boundary to the eighth boundary in a same row of pixels, and determining a first pixel whose pixel value is the first pixel value as the third edge point; scanning from the eighth boundary to the seventh boundary, and determining a first pixel whose pixel value is the first pixel value as the second edge point; determining a second center point of the third edge point and the second edge point in the same row of pixels; scanning from the second center point to the seventh boundary, and determining a first pixel whose pixel value is the first pixel value as the fourth edge point; scanning from the second center point to the eighth boundary, and determining a first pixel whose pixel value is the first pixel value as the first edge point.

5. The linewidth measurement method according to claim 1, wherein determining the width of the first line segment according to the first edge point and the second edge point comprises:

performing straight line fitting on a plurality of first edge points to obtain the first edge line; and performing straight line fitting on a plurality of second edge points to obtain the second edge line;

calculating a first distance from the first edge point to the second edge line and a second distance from the second edge point to the first edge line; and calculating an average of the first distance and the second distance to obtain a width of the first line segment;

before determining the width of the line according to the width of the first line segment, the method further comprises:

performing straight line fitting on a plurality of third edge points to obtain the third edge line and performing straight line fitting on a plurality of fourth edge points to obtain the fourth edge line;

calculating a third distance from the third edge point to the fourth edge line and a fourth distance from the fourth edge point to the third edge line; and calculating an average of the third distance and the fourth distance to obtain a width of the second line segment;

determining the width of the line according to the width of the first line comprises:

determining the width of the line according to the width of the first line segment and the width of the second line segment, wherein the width of the line comprises at least one of: an average of the width of the first line segment and the width of the second line segment, the width of the first line segment and the width of the second line segment.

6. The linewidth measurement method according to claim 4, wherein the target connected region further comprises a second connected region corresponding to the second line segment, and determining the sampling region in the region connected image comprises:

determining overlapping coordinates of the first connected region and the second connected region based on the region connected image, wherein the overlapping coordinates are coordinates of an overlapping pixel located in an overlapping region of the first connected region and the second connected region; and determining the first sampling region and the second sampling region according to the overlapping coordinates and a ninth boundary and a tenth boundary of the region connected image which are oppositely arranged in the column direction, wherein the first boundary is determined by translation of the ninth boundary by a first preset distance in the column direction towards a direction of the overlapping pixel, the second boundary is determined by translation of a first dividing line by a second preset distance in the column direction towards a direction of the ninth boundary, the fifth boundary is determined by translation of the first dividing line by a third preset distance in the column direction towards a direction of the tenth boundary, the sixth boundary is determined by translation of the tenth boundary by a fourth preset distance in the column direction towards a direction of the overlapping pixel, and the first dividing line is a straight line passing through the overlapping pixel and extending in the row direction.

7. The linewidth measurement method according to claim 6, wherein the region connected image further comprises a reference boundary connecting the ninth boundary and the tenth boundary, and an extension direction of the first line segment and/or the second line segment is different from the column direction, and determining the overlapping coordinates of the first connected region and the second connected region based on the region connected image comprises:

performing progressive scanning on the pixels in the region connected image from the ninth boundary, wherein the progressive scanning comprises: if a distance between a reference pixel of a current scanning row and the reference boundary is greater than or equal to a distance between a reference pixel of a previous scanning row and the reference boundary, and greater than or equal to a distance between a reference pixel of a next scanning row and the reference boundary, determining coordinates of the reference pixel of the current scanning row as the overlapping coordinates, wherein the reference pixel is a first pixel whose pixel value is the first pixel value in the same row of pixels in scanning from the reference boundary.

8. The linewidth measurement method according to claim 6, wherein determining the overlapping coordinates of the first connected region and the second connected region based on the region connected image comprises:
performing straight line detection on the pixels in the first connected region and the second connected region to obtain a plurality of detected line segments;
clustering the plurality of detected line segments to obtain two clusters; and
determining intersection coordinates of two line segments corresponding to cluster centers of the two clusters as the overlapping coordinates.

9. The linewidth measurement method according to claim 1, wherein the first line segment comprises a fifth branch line, and a plurality of pixels of the region connected image are arrayed in array in the row direction and in the column direction, extracting pixels on two opposite sides of the first connected region in the first direction to obtain the first edge point and the second edge point comprises:
determining a third sampling region in the region connected image, wherein the third sampling region comprises an eleventh boundary and a twelfth boundary which are oppositely arranged in the column direction, and a thirteenth boundary and a fourteenth boundary which connect the eleventh boundary and the twelfth boundary, a target connected region in the third sampling region comprises a fifth sub-connected region corresponding to the fifth branch line, and two oppositely arranged sides of the fifth sub-connected region in the first direction are connected with both the eleventh boundary and the twelfth boundary; and
performing a third scanning treatment on pixels in the third sampling region, wherein the third scanning treatment comprises scanning from the thirteenth boundary to the fourteenth boundary in a same row of pixels, and determining a first pixel whose pixel value is the first pixel value as the first edge point; and scanning from the fourteenth boundary to the thirteenth boundary, and determining a first pixel whose pixel value is the first pixel value as the second edge point.

10. The linewidth measurement method according to claim 2, wherein the target connected region comprises a third connected region corresponding to the first line segment, the first edge line comprises a first outer edge line and a first inner edge line, and the second edge line comprises a second outer edge line and a second inner edge line, and a convolution kernel used in the expansion treatment is smaller than that used in the corrosion treatment, so that one of two opposite sides of the third connected region in the first direction is located between the first outer edge line and the first inner edge line, and the other side of the two opposite sides is located between the second outer edge line and the second inner edge line.

11. The linewidth measurement method according to claim 10, wherein the line further comprises a second line segment which intersects with the first line segment, and the first line segment comprises a sixth branch line which is located at one side of an intersection of the first line segment and the second line segment, and after obtaining the region connected image, the method further comprises:
extracting a skeleton image of the region connected image, wherein the skeleton image comprises a skeleton, a pixel value of each pixel in the skeleton is different from a pixel value of each pixel outside the skeleton, and the skeleton comprises a center line corresponding to the sixth branch line;
before determining the first edge point and the second edge point of the first line segment based on the region connected image, the method further comprises:
performing straight line detection on the edge image so as to obtain a plurality of edge line segments; and
determining a target line segment corresponding to the sixth branch line from the plurality of edge line segments;
determining the first edge point and the second edge point of the first line segment based on the region connected image comprises:
determining the first outer edge line, the first inner edge line, the second outer edge line and the second inner edge line from the target line segment according to a relationship between a position of the target line segment in the edge image, a position of the third connected region in the region connected image and a position of the center line in the skeleton image.

12. The linewidth measurement method according to claim 11, wherein determining the first outer edge line, the first inner edge line, the second outer edge line and the second inner edge line from the target line segment according to the relationship between the position of the target line segment in the edge image, the position of the third connected region in the region connected image and the position of the center line in the skeleton image comprises:
according to the position of the target line segment in the edge image, determining a first mapping region corresponding to the target line segment at a corresponding position in the region connected image, and determining a second mapping region corresponding to the target line segment at a corresponding position in the skeleton image;
if the first mapping region is located at a first side outside the third connected region, determining the target line segment corresponding to the first mapping region as the first outer edge line;
if the first mapping region is located at a second side outside the third connected region, determining the target line segment corresponding to the first mapping region as the second outer edge line;
if the first mapping region is located within the third connected region and the second mapping region is located at a first side of the center line, determining target line segments corresponding to the first mapping region and the second mapping region as the first inner edge line; and
if the first mapping region is located within the third connected region and the second mapping region is located at a second side of the center line, determining target line segments corresponding to the first mapping region and the second mapping region as the second inner edge line.

13. The linewidth measurement method according to claim 12, wherein the region connected image comprises a fifteenth boundary and a sixteenth boundary which are oppositely arranged, before determining the first outer edge line, the first inner edge line, the second outer edge line and the second inner edge line from the target line segment according to the relationship between the position of the target line segment in the edge image, the position of the third connected region in the region connected image and the position of the center line in the skeleton image, the method comprises:

setting a pixel value of each pixel in a region located between the target connected region and the fifteenth boundary and a region located between the target connected region and the sixteenth boundary in the region connected image as the third pixel value;

if a pixel value of each pixel in the first mapping region is the third pixel value, determining that the first mapping region is located at the first side outside the third connected region;

if the pixel value of each pixel in the first mapping region is the second pixel value, determining that the first mapping region is located at the second side outside the third connected region; and if the pixel value of each pixel in the first mapping region is the first pixel value, determining that the first mapping region is located within the third connected region.

14. The linewidth measurement method according to claim 12, wherein before determining the first outer edge line, the first inner edge line, the second outer edge line and the second inner edge line from the target line segment according to the relationship between the position of the target line segment in the edge image, the position of the third connected region in the region connected image and the position of the center line in the skeleton image, the method further comprises:

performing an exclusive-or operation on the region connected image and the expanded image so as to obtain an intermediate image, wherein the intermediate image comprises a plurality of discrete complementary regions, a pixel value of each pixel in the plurality of discrete complementary regions is the fourth pixel value, a pixel value of each pixel outside the plurality of discrete complementary regions is a fifth pixel value, and the intermediate image comprises a seventeenth boundary and an eighteenth boundary which are oppositely arranged;

setting a pixel value of each pixel in a complementary region adjacent to the seventeenth boundary and a complementary region adjacent to the eighteenth boundary in the intermediate image as a sixth pixel value;

determining a third mapping region corresponding to the target line segment at a corresponding position in the intermediate image according to the position of the target line segment in the edge image;

if a pixel value of each pixel in the third mapping region is the sixth pixel value, determining that the first mapping region is located at the first side outside the third connected region; and if the pixel value of each pixel in the third mapping region is the fourth pixel value, determining that the first mapping region is located at the second side outside the third connected region.

15. The linewidth measurement method according to claim 12, wherein the skeleton image comprises a nineteenth boundary and a twentieth boundary which are oppositely arranged, and a pixel value of each pixel in the skeleton is a seventh pixel value, and the pixel value of each pixel outside the skeleton is an eighth pixel value; and before determining the first outer edge line, the first inner edge line, the second outer edge line and the second inner edge line from the target line segment according to the relationship between the position of the target line segment in the edge image, the position of the third connected region in the region connected image and the position of the center line in the skeleton image, the method comprises:

setting a pixel value of each pixel in a region located between the skeleton and the nineteenth boundary and a region located between the skeleton and the twentieth boundary in the skeleton image as a ninth pixel value;

if a pixel value of each pixel in the second mapping region is the ninth pixel value, determining that the second mapping region is located at a first side of the center line; and if the pixel value of each pixel in the second mapping region is the eighth pixel value, determining that the second mapping region is located at a second side of the center line.

16. The linewidth measurement method according to claim 11, wherein determining the width of the first line segment according to the first edge point and the second edge point comprises:

calculating a fifth distance from an end point of the first outer edge line to the second outer edge line;

calculating a sixth distance from the end point of the second outer edge line to the first outer edge line;

calculating a seventh distance from the end point of the first inner edge line to the second inner edge line;

calculating an eighth distance from the end point of the second inner edge line to the first inner edge line; and calculating an average of the fifth distance, the sixth distance, the seventh distance and the eighth distance to obtain the width of the first line segment.

17. The linewidth measurement method according to claim 1, wherein obtaining the target image of the line comprises:

obtaining an original image of the line; and performing preprocessing on the original image to obtain the target image, wherein the preprocessing comprises at least one of graying, contrast enhancement, brightness enhancement and denoising, wherein performing preprocessing on the original image comprises:

performing the denoising on the original image to obtain a denoised image;

extracting edge pixels of the denoised image and counting a total number of the edge pixels; and if the total number is less than or equal to a preset number, performing the contrast enhancement on the original image.

18. A computing processing device, comprising:

a memory with computer readable codes stored therein;

one or more processors, the computing processing device executing the method according to claim 1 when the computer readable code is executed by the one or more processors.

* * * * *